US012756696B2

(12) United States Patent
Bate et al.

(10) Patent No.: US 12,756,696 B2
(45) **Date of Patent: *Oct. 6, 2026**

(54) AIR GAP-BASED NETWORK ISOLATION DEVICE CIRCUIT BOARD

(71) Applicant: Goldilock Secure Limited, London (GB)

(72) Inventors: Richard Bate, London (GB); Mohamed Samak, London (GB); Josh Homerston, London (GB); Anthony Hasek, London (GB)

(73) Assignee: Goldilock Secure Limited, Wolverhampton (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/688,641

(22) PCT Filed: Sep. 2, 2022

(86) PCT No.: PCT/GB2022/052250

§ 371 (c)(1),
(2) Date: Mar. 1, 2024

(87) PCT Pub. No.: WO2023/031624

PCT Pub. Date: Mar. 9, 2023

(65) Prior Publication Data

US 2025/0119414 A1 Apr. 10, 2025

Related U.S. Application Data

(63) Continuation-in-part of application No. 17/689,812, filed on Mar. 8, 2022, now Pat. No. 11,616,781, and (Continued)

(30) Foreign Application Priority Data

Apr. 4, 2022 (GB) ..................................... 2204921

(51) Int. Cl.
*H04L 9/40* (2022.01)

(52) U.S. Cl.
CPC .................................... *H04L 63/08* (2013.01)

(58) Field of Classification Search
CPC ................................ H04L 63/08; H04L 63/18
See application file for complete search history.

(56) References Cited

U.S. PATENT DOCUMENTS

| | | | |
|---|---|---|---|
| 6,594,762 | B1 | 7/2003 | Doub |
| 8,984,275 | B2 | 3/2015 | Ozgit |

(Continued)

FOREIGN PATENT DOCUMENTS

| | | |
|---|---|---|
| CN | 105721476 B | 6/2016 |
| CN | 106572101 | 4/2017 |

(Continued)

OTHER PUBLICATIONS

Examination Report dated Sep. 22, 2022, Application No. GB2204921.7 5 pages.

(Continued)

*Primary Examiner* — Javier O Guzman
(74) *Attorney, Agent, or Firm* — Mahamedi IP Law LLP

(57) ABSTRACT

A circuit board for an air-gap-based, network isolation device includes a set of connection port elements, each connection port element in the set of connection port elements being connected to relay array and comprising a plurality of connection ports. Each of the connection port elements comprises a network connection port configured to connect the circuit board to a network link. The circuit board further includes a controller connected to each relay array, and a communications module comprising a set of communication receivers connected to the controller. The communications module receives commands from a master com- (Continued)

puter, external to the circuit board, to close each relay array connected to each of the set of connection port elements.

15 Claims, 14 Drawing Sheets

Related U.S. Application Data a continuation-in-part of application No. 17/467,151, filed on Sep. 3, 2021, now Pat. No. 12,238,103.

(56) References Cited

U.S. PATENT DOCUMENTS 9,225,352 B2 12/2015 Kobayashi
10,154,029 B1 12/2018 Griffin
10,404,474 B1 9/2019 Caceres
10,681,793 B1 6/2020 Sanson
11,115,390 B2 9/2021 Hasek
11,362,844 B1 6/2022 Cook
11,368,437 B2 6/2022 Wimmer
11,381,473 B1 7/2022 Corwin
11,616,781 B2 3/2023 Hasek
11,997,112 B1 5/2024 Sanders
12,244,595 B2 3/2025 Hasek
2002/0053032 A1 5/2002 Dowling
2003/0172145 A1 9/2003 Nguyen
2003/0208606 A1 11/2003 Maguire
2004/0085941 A1 5/2004 Li
2004/0260941 A1 12/2004 Fearnley
2006/0013382 A1 1/2006 Hoshikawa
2006/0242423 A1* 10/2006 Kussmaul ............. H04L 9/3247 713/182
2007/0143398 A1 6/2007 Graham
2007/0260687 A1 11/2007 Rao
2008/0082677 A1 4/2008 Miyazawa
2009/0254572 A1 10/2009 Redlich
2010/0318785 A1* 12/2010 Ozgit .................. H04L 63/0209 713/153
2010/0319063 A1 12/2010 Koppolu
2013/0257406 A1 10/2013 Hausman, Jr.
2013/0268931 A1 10/2013 O'Hare et al.
2013/0324083 A1 12/2013 Celi
2014/0052864 A1 2/2014 Van Der Linden et al.
2014/0119727 A1 5/2014 Ousley
2014/0136671 A1 5/2014 Drake
2014/0176182 A1 6/2014 Kuhn
2014/0181315 A1 6/2014 Nakagawa
2014/0297899 A1 10/2014 Chang
2014/0317753 A1 10/2014 Frenkel
2015/0024710 A1 1/2015 Becker
2015/0042464 A1 2/2015 Yu
2015/0047058 A1 2/2015 Matthews
2015/0341209 A1 11/2015 Wittenschlaeger
2015/0381658 A1 12/2015 Poornachandran
2016/0077762 A1 3/2016 Ide
2016/0180331 A1 6/2016 Tuscano
2016/0277216 A1 9/2016 Carson
2016/0337359 A1 11/2016 Hojsik
2016/0359874 A1* 12/2016 Black .................. H04W 12/069
2017/0195477 A1 7/2017 Jones-Mcfadden
2017/0272984 A1 9/2017 Yu
2017/0324566 A1 11/2017 Kawasaki
2018/0007021 A1 1/2018 Deriso
2018/0019999 A1 1/2018 Naegle
2018/0176776 A1 6/2018 Knaappila
2018/0211036 A1 7/2018 Zlotnik
2018/0213002 A1* 7/2018 Figovsky ................ G06F 21/53
2018/0234437 A1 8/2018 McGaughey
2018/0337948 A1 11/2018 Chu
2018/0338017 A1 11/2018 Mekuria
2019/0068617 A1 2/2019 Coleman
2019/0114405 A1 4/2019 Shibata
2019/0141540 A1 5/2019 Thurbert
2019/0173853 A1 6/2019 Hasek
2019/0190891 A1 6/2019 Pillai
2019/0268165 A1 8/2019 Monica
2019/0312752 A1 10/2019 Nogueira-Nine
2019/0348232 A1 11/2019 Chen
2020/0065502 A1 2/2020 Lockman
2020/0120136 A1 4/2020 Gadhe
2020/0145420 A1 5/2020 Haletky
2020/0145434 A1 5/2020 Haletky
2020/0204435 A1 6/2020 Matsui
2020/0204656 A1 6/2020 Lee
2020/0252273 A1 8/2020 Kay
2020/0272757 A1* 8/2020 Huitt ....................... G06F 21/56
2020/0285734 A1 9/2020 Zamir
2020/0304482 A1 9/2020 Nissan
2020/0342109 A1 10/2020 Wright
2020/0365345 A1* 11/2020 Telefus .................. H01H 71/24
2020/0396911 A1 12/2020 Stouffer
2021/0014229 A1 1/2021 Beveridge
2021/0044563 A1 2/2021 Reyes
2021/0110068 A1* 4/2021 Voss ........................ H04L 12/50
2021/0127244 A1 4/2021 Choi
2021/0133310 A1* 5/2021 Thompson ............ H04L 9/3234
2021/0136644 A1 5/2021 Park
2021/0141893 A1 5/2021 Soman
2021/0173907 A1 6/2021 Keith, Jr.
2021/0176235 A1 6/2021 Keith, Jr.
2021/0182438 A1* 6/2021 Huitt ....................... G06F 21/84
2021/0224374 A1 7/2021 Fong
2021/0250333 A1 8/2021 Negrea
2021/0352085 A1* 11/2021 Reyes ................. H04L 63/1408
2022/0060476 A1 2/2022 Hasek
2022/0094686 A1 3/2022 Jain
2022/0150280 A1 5/2022 Azulay
2022/0182833 A1* 6/2022 Draper .................... H04L 67/56
2022/0286441 A1 9/2022 Kuehnel
2022/0326929 A1 10/2022 Sharma
2022/0345457 A1 10/2022 Jeffords
2022/0353256 A1 11/2022 Cizar
2023/0012696 A1* 1/2023 Sapir .................. G06K 7/10722
2025/0240295 A1 7/2025 Hasek
2025/0240296 A1 7/2025 Hasek

FOREIGN PATENT DOCUMENTS

EP 2317450 5/2011
GB 2610458 B 7/2025
WO WO-01/95069 12/2001
WO WO-2005/101724 10/2005
WO WO-2019/113237 6/2019
WO WO-2019/243657 12/2019
WO WO-2019243657 A1 * 12/2019 ............. H04L 63/02
WO WO-2023/031624 A1 3/2023
WO WO-2025/262412 A1 12/2025

OTHER PUBLICATIONS

International Search Report and The Written Opinion of The International Searching Authority mailed Dec. 23, 2022, for related PCT Application No. PCT/GB2022/052250 filed Sep. 2, 2022, 19 pages.
International Search Report and The Written Opinion of The International Searching Authority mailed Mar. 14, 2019, for related PCT Application No. PCT/US18/064105 filed Dec. 5, 2018, 8 pages.
International Search Report and Written Opinion of the International Searching Authority mailed Sep. 16, 2025 for PCT Application No. PCT/GB2025/051319 filed Jun. 16, 2025. 15 pages.
Examination Report dated Jun. 19, 2024, Application No. GB2204921.7 6 pages.
Examination Report dated Nov. 26, 2025, Application No. GB2508492.2 4 pages.
Examination Report dated Jan. 9, 2026, Application No. 22792868.6 7 pages.

* cited by examiner

AIR GAP-BASED NETWORK ISOLATION DEVICE CIRCUIT BOARD

TECHNICAL FIELD

Examples include a storage system that utilizes discrete on-demand memory resources. Examples described here further include exemplary circuit board designs for implementing the functions of example air-gap-based network isolation devices described throughout the present disclosure.

BACKGROUND

There are increasingly greater amounts of data which are sensitive and personal to individuals. For example, people increasingly rely on passwords for a variety of purposes, and passwords are increasingly more complex and difficult to member. People also digitize important documents, such as birth certificates and other documentation. More recently, there is increasing use of cryptocurrencies. When managing and transacting with cryptocurrencies, people need to use private keys to ownership and sign transactions. People often store such sensitive and valuable information on their computers, on 3rd party internet sites, or on personally-held hardware devices. Hardware or PC storage leaves the individuals vulnerable when their devices are lost, stolen, or hacked. Another solution is for individuals to store sensitive data in the "cloud" (e.g., network account), but online accounts can be accessed without authorization, though traditional hacking or, for example, man-in-the-middle attacks.

DETAILED DESCRIPTION

Figure 1:
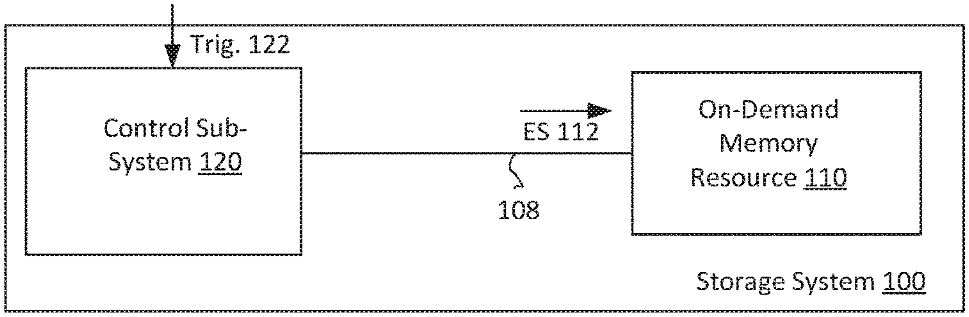
FIG. 1 illustrates an example storage device to persistently store a sensitive data set.

According to examples, a storage device includes a discrete memory resource and a controller. The memory resource may have a characteristic of existing in each of an off-state and an on-state. The memory resource may be structured to persistently store a sensitive data set when in the off-state, and to enable read and/or write access only when in the on-state. The controller may be coupled to the memory resource to provide an electrical signal to the memory resource in response to an external trigger signal. The electrical signal may cause the memory resource to switch from the off-state into the on-state for a duration that is based on, for example, one or more of (i) a duration of the external trigger signal, (ii) a predetermined duration that is triggered with the external trigger signal, and/or (iii) an occurrence of an ending event, following the external trigger signal. The controller may enable at least one of a read or write operation while the memory resource is in the on-state.

In some variations, the controller controls switching of the memory resource between the on and off states. For example, the controller can switch the memory resource into the on-state by manipulating the memory resource to physically contact a signal line for electrical input. Likewise, the controller may switch the memory resource into the off-state by manipulating the memory resource to separate, or otherwise form an airgap with the signal line for the electrical input. In such examples, the controller may be remotely accessible to a user using a non-IP (Internet Protocol) communication channel (e.g., Public Switch Telephone Network (PSTN)). When accessed, the controller switches the memory resource to the on-state, enabling the memory resource to be remotely accessible over an IP channel. In the on-state, the memory resource can receive and implement read and write operations using the IP channel.

Still further, in some variations, a storage system includes a call router to receive incoming telephone calls, and multiple on-demand discrete memory resources. The call router receives incoming telephone calls, and for each incoming telephone call, the call router selects a discrete memory resource based on caller information provided with the respective incoming call. Each discrete memory resource may be structured to persistently store a sensitive data set when in the off-state, and to enable read and/or write access only when in the on-state.

In some examples, a method for operating a storage device includes receiving an incoming telephone call, and selecting a discrete memory resource from a plurality of discrete memory resources based on caller information of the incoming telephone call. Additionally, an example includes providing an electrical input signal to the selected discrete memory resource, where the electrical input signal causes the discrete memory resource to be accessible for a duration that can be determined by, for example, one or more of the incoming telephone call, timer, or the occurrence of one or more events (e.g., start and ending events).

In other examples, a storage system or device selects a memory resource component from an array of memory resources components, where each memory resource component is not accessible over the Internet until that memory resource component is switched from an unconnected state into a connected state. When in the unconnected state, the memory resource component is not accessible over a data network such as the Internet. When in the connected state, the selected memory resource component becomes accessible over the data network (e.g., over the Internet). When in the connected state, the memory resource component may also be said to be activated (as opposed to deactivated). The storage system or device generates a trigger signal that activates the selected memory resource component, such that the activated memory resource component is accessible over a data network that includes the Internet for a given duration.

As described with various examples, the transition from an unconnected state to a connected state may coincide with a state change of a corresponding switch (e.g., airgap switch). By way of example, the state change of the corresponding switch may connect the selected memory resource component to a network communication resource (e.g., gateway), which makes the memory resource component accessible over a data network (e.g., Internet Protocol network). In variations, the state change of the corresponding switch may connect the selected memory resource component to a power source, which then makes the memory access component accessible over a data network.

According to examples, the selection of the memory resource component can be based on information provided with or determined from the incoming call. For example, the selection of the memory resource can be based on a phone number that is specified by the call (e.g., the dialed phone number), a code which the caller specifies when a call is connected, and/or a phone number of the caller.

Further described herein is an air gap-based network isolation device that includes hardware componentry for isolating downstream networks and computing devices from external networks. The network isolation device includes an out-of-band receiver coupled to an airgap control device-such as a mechanical relay, an actuator, or an optocoupler—that closes and opens a physical air gap in response to an out-of-band signal. For example, an internal network (e.g., an Ethernet network utilizing an Internet Protocol (IP)) may be isolated from other networks (e.g., the Internet) using the network isolation device as an access point to the internal network. As an example, the internal network can be comprised of computing devices, memory resources, and/or other digital assets of an entity that desires increased security to isolate its computing devices from other networks in an on-demand manner.

The network isolation device includes an internal network interface, such as a universal serial bus (USB) and/or RJ45 port, that connects the network isolation device to the internal network. The network isolation device further includes a second network port (e.g., on an opposing end of the device) that connects the network isolation device to an external network, such as the Internet. The network isolation device can further include circuitry comprising a signal receiver controlling a device that opens and closes an air gap. In accordance with examples described herein, the signal receiver can comprise a telephone receiver, a cellular receiver, a radio signal receiver, a LoRa receiver, or any suitable non-IP receiver.

In various implementations, the signal receiver can include a dedicated hardware signal filter that provides an initial analog authentication layer for incoming access signals (e.g., out-of-band wireless signals, such as radio, LoRa, SMS, etc., or wired signals utilizing protocols that are distinct from the external network communication protocols). In some aspects, the hardware signal filter can comprise a specialized chip (e.g., an application-specific integrated circuit (ASIC)) representing an encryption and/or decryption algorithm that prevents unwanted access to signal authentication software executing on the signal receiver. It is contemplated that utilization of a dedicated hardware authentication layer renders any attempts at unwanted access to the internal network virtually impossible. As an addition or an alternative, the signal receiver can include a digital signal processor or other processing device executing authentication instructions to authenticate the wireless access signal.

Once authenticated, the signal receiver can control the device (e.g., mechanical relay, actuator, or optocoupler) to close the air gap and provide network connectivity to the external network(s). As an on-demand device, the network isolation device can be controlled remotely using any type of out-of-band signal that corresponds to the signal receiver. As an example, the signal receiver may receive an SMS message from a particular phone number that includes a specified code for authentication. The hardware signal filter can pre-process the SMS message (e.g., verify that it came from a correct phone number or an authorized device identifier). Upon initial verification by the hardware filter, the SMS message may be further processed by the signal authenticator of the signal receiver, which can verify a secondary code embedded in the message (e.g., via a decryption algorithm). Once verified, the signal receiver can control the device to close the air gap and enable access, or open the air gap to remove access.

Among other benefits, examples recognize that a primary source of vulnerability to online accounts and digital assets is that the computers which host the accounts are continuously present and accessible over the Internet. Because these computers are accessible, attackers can garner information about the accounts, even when the accounts are not in use. In contrast to conventional approaches which utilize computers that remain online, examples provide for a system which maintains the physical source (e.g., storage devices or memory resource components) of a user's account offline (e.g., in an off-state, or without access to data network connectivity) until the user needs access to his or her data set. By keeping such devices or components offline, examples prevent unauthorized access by, for example, attackers who could otherwise discover or probe for sources of online information.

Examples described herein further include hardware circuitry arrangements for an air gap-based network isolation device. The device can be implemented on a circuit board that includes a set of connection port elements (e.g., Ethernet, USB, fiberoptic, twisted-pair, coaxial, and the like). Each connection port element can be electrically coupled to a set of relays that provide network isolation from a connected network in an on-demand manner.

The controller can connect to a communications module comprising a set of communication interfaces (e.g., receivers and/or drivers) that are configured to enable out-of-band communications (e.g., SMS, LoRa, RS-232, RS-485, Can-Bus, Modbus, Fieldbus, LPWAN, Wireless HART, Zigbee, I2C, etc.) between the circuit board and a computing device, such as a mobile smartphone or LoRa radio transceiver. As an addition or alternative, the communications module can communicate serially with the master computer and internal controller to open and close the relays coupled to the connection port elements.

As provided herein, each connection port element can contain a pair of connection ports. For example, a connection port element can contain a port-in connection and a port-out connection comprising the same type or a combination of connector types (e.g., USB, RJ45, fiber optic, etc.). The port-in connection can be connected to the user's computing device, computing system, or memory device requiring network isolation. The port-out connection can be connected to a network link, such as an Ethernet router, network switch, Wi-Fi router, and the like.

In one example, the connection port elements are arranged on a proximal end of the circuit board and the communications module is arranged on a distal end of the circuit board, with the controller, one or more flyback diodes, and relays arranged suitably therebetween. In implementation, a user can plug a computing device, computing system, and/or memory resource to the port-in connections of the port elements and connect the network link(s) to the port-out connections of the port elements. In a default mode, the airgaps contained in the relays may remain open, thereby maintaining a disconnected state for the user's computing device(s), computing system(s), and/or memory resources. Alternatively, a default mode can comprise a closed airgap configuration, or connected state, in which activation is required to disconnect the computing and memory resources from the network link(s).

As provided herein, each of the connection port elements can be configured with an authentication protocol and device whitelist to open or close the relays that provide the network connectivity to the computing resources and/or memory resources that are connected to the circuit board. For example, a user can interact with a user interface connected to the master computer to provide each connection port element with a whitelist of communication devices that can operate to open or close the airgaps connected to the connection port element. The user can further provide an authentication protocol that is required to actuate the airgaps connected to the connection port element, such as a specified text message exchange with the one or more controllers (e.g., an initial message, response message, code word, and/or confirmation message).

As described, each connection port element can be configured with a unique authentication protocol and whitelist of authorized devices that can control access to the network link(s). In further examples, a connection port element can be configured with a timer that enables network connectivity for a set period of time before the air gaps open automatically and disconnect the computing and/or memory resources from the network (e.g., the Internet). In still further examples, each connection port element can include or otherwise be connected to a status indicator (e.g., a multi-color LED) that provides visual indication of the current status of the connection port element, such as unique colors for "connected," "disconnected," and "authorization in progress" statuses.

In certain implementations, the circuit board can also include wired connectors that enable a daisy chain of circuit boards to be connected to each other and configured accordingly. For example, the communications module of the circuit board can include wired interfaces that enable a technician to daisy chain multiple circuit boards to each other. For such daisy chain implementations, the master computer (e.g., external to the circuit boards) can detect each connected circuit board in the daisy chain, store the authentication configurations for each connection port element of each circuit board, and control connectivity across the entire daisy chain accordingly.

It is contemplated that sensitive documents and other stored information-such as crypto-keys and documents requiring confidential, top secret, or classified status—can be provided with impervious, physical isolation from networks using the circuitry and functionality described herein. Using robust device authorization and authentication techniques described herein, users can ensure that only trusted devices and users can access computing and memory systems connected to the air-gap-based network isolation device.

One or more examples described provide that methods, techniques, and actions performed by a computing device are performed programmatically, or as a computer-implemented method. Programmatically, as used, means through the use of code or computer-executable instructions. These instructions can be stored in one or more memory resources of the computing device. A programmatically performed step may or may not be automatic.

One or more examples described can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs, or machines.

Some examples described can generally require the use of computing devices, including processing and memory resources. For example, one or more examples described may be implemented, in whole or in part, on computing devices such as servers, desktop computers, cellular or smartphones, and tablet devices. Memory, processing, and network resources may all be used in connection with the establishment, use, or performance of any example described herein (including with the performance of any method or with the implementation of any system).

Furthermore, one or more examples described may be implemented through the use of instructions that are executable by one or more processors. These instructions may be carried on a computer-readable medium. Machines shown or described with figures below provide examples of processing resources and computer-readable mediums on which instructions for implementing examples described can be carried and/or executed. In particular, the numerous machines shown with examples described include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

FIG. 1 illustrates an example storage system to persistently store a sensitive data set. As described with various examples, the storage system 100 includes a control sub-system 120 and a discrete, on-demand memory resource 110 that is capable of persistently storing data in an off-state. An external trigger signal can be supplied to the storage system 100, to cause the memory resource 110 to switch to an on-state for a duration that is defined by a duration of the external trigger signal 122.

The storage system 100 can store sensitive data (e.g., cryptocurrency) on a network computer system, using a respective memory resource 110 that, by default, exists in an off-state. In the off-state, the memory resource is not accessible over the IP channel. The storage system 100 can make the memory resource 110 accessible to an authorized party who can provide an external trigger signal 122 to the storage system 100. In this way, the accessibility of the memory resource 110 may be limited in time, to a duration that is based on or responsive to the control sub-system 120 receiving the external trigger signal 122. Additionally, access to the memory resource 110 may be limited to a party that can be authorized by way of generating the external trigger signal 122.

As described with some examples, the storage system 100 can be associated with a telephone number, and the external trigger signal 122 can be provided by a telephonic call. The memory resource 110 can be made accessible to a party that can be authorized by placing a telephone call using the telephone number that is associated with the storage system 100.

In more detail, the control sub-system 120 is coupled to the memory resource 110 by a signal path 108. In the off-state, a bit state of individual memory cells that comprise the memory resource 110 are static and inaccessible, meaning the bit state of the individual memory cells cannot be read or changed without application of an electrical input to the individual memory cells. In this way, the memory resource 110 is not readable or writeable when in the off-state. As described by examples, the memory resource 110 can be switched intermittingly into the on-state. When the memory resource 110 is in the on-state, the memory resource 110 can be subjected to read operations, as well as write operations which change the respective bit state of the individual memory cells that comprise the memory resource 110. Thus, in the on-state, the bit state of select memory cells of the memory resource 110 may be changed to reflect values that correspond to a sensitive data set.

The control sub-system 120 uses the signal path 108 to send an electrical signal 112 to the memory resource 110 across the signal path 108. The electrical signal 112 provides electrical input for memory cells of the memory resource 110, to enable, for example, read and write operations to be performed on the memory resource 110. In examples, the memory resource 110 is switched instantly into the on-state with application of the electrical signal 112. The control sub-system 120 can terminate the electrical signal 112, causing the memory resource 110 to switch instantly to the off-state.

According to an example, the memory resource 110 exists by default in the off-state, during which the memory cells of the memory resource 110 are inert. The control sub-system 120 provides the electrical signal 112 to the memory resource 110 upon the control sub-system 120 receiving an external trigger signal 122. In some examples, the control sub-system 120 may receive an incoming telephone call as the external trigger signal 122. In such examples, the control sub-system 120 is triggered into providing the electrical signal 112 to the memory resource 110 upon receiving an incoming call. Once the telephone call ends, the control sub-system 120 terminates the electrical signal 112, causing the memory resource 110 to return instantly to the off-state.

In variations, the memory resource 110 and the control sub-system 120 of storage system 100 are co-located on a common substrate 106, such as a circuit board. The control sub-system 120 can include resources to receive the external trigger signal 122, and to provide the electrical signal 112 to the memory resource 110 via the signal path 108. In some examples, the storage system 100 is assigned to a telephone number, and the control sub-system 120 can receive an incoming telephone call for the assigned telephone number in order to generate the electrical signal 112 for the memory resource 110.

Figure 2A:
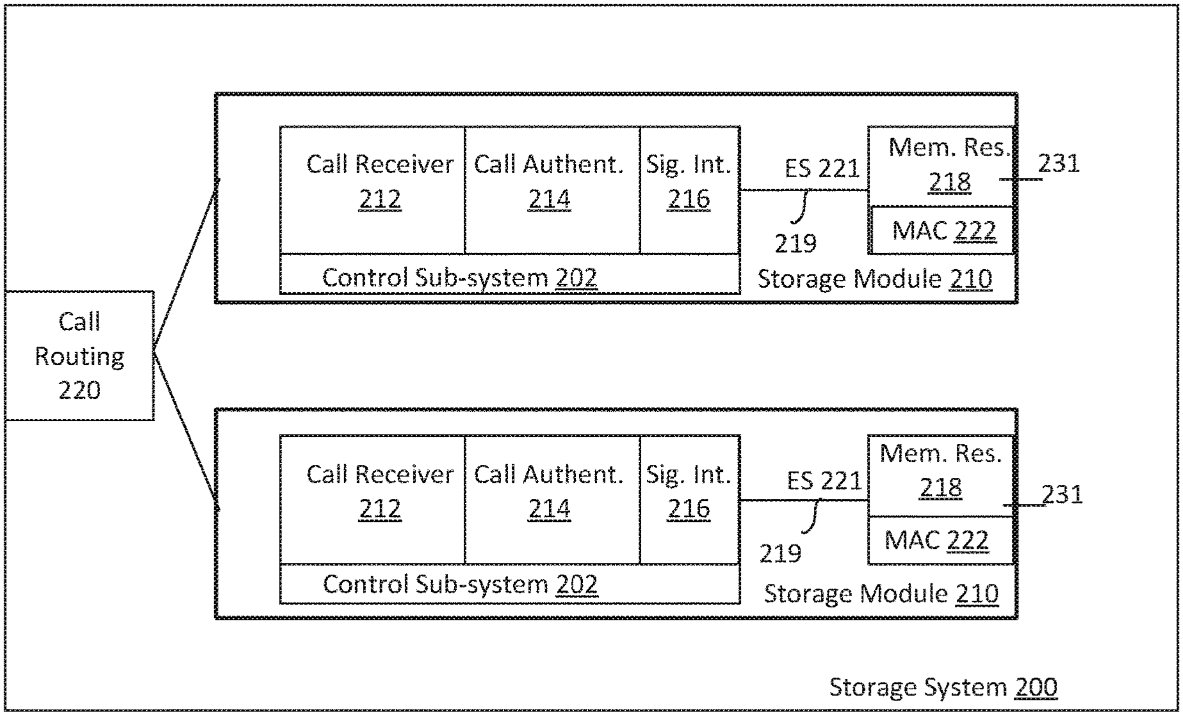
FIG. 2A illustrates an example storage system that utilizes discrete on-demand memory resources.

FIG. 2A illustrates an example storage system that utilizes discrete on-demand memory resources. In an example, a storage system 200 includes multiple storage modules 210, with each of the multiple storage modules 210 being assigned to a corresponding telephone number 215. In examples such as shown by FIG. 2A, functional components of the control sub-system 202 may be co-located with a device of storage module 210. In other variations, the control sub-system 202 can be implemented on one or more devices that are physically separated from a device of the storage module 210. For example, the control sub-system 202 can be implemented a network computer (e.g., server), separate from a substrate or computing device of the storage module 210. Still further, components described with the control sub-system 202 can be distributed, so that some functionality described is co-located with the storage module 210. In variations, the control sub-system 202 includes a call router 220 to receive and route incoming telephone calls to respective storage devices that are assigned the corresponding telephone numbers. The call router 220 may, for example, include a lookup table that matches an incoming telephone call to a storage device identifier.

In some examples, the control sub-system includes a call receiver 212, an authentication component 214, a signal interface 216 and an on-demand memory resource 218. The call receiver 212 can receive an incoming telephone call 211. In an example, the call receiver 212 connects to an incoming telephone call 211 which specifies the telephone number 215 assigned to the storage module 210. The call receiver 212 sustains the connection with incoming telephone call 211 for a duration determined by the incoming telephone call 211 (e.g., until caller hangs up).

Figure 2B:
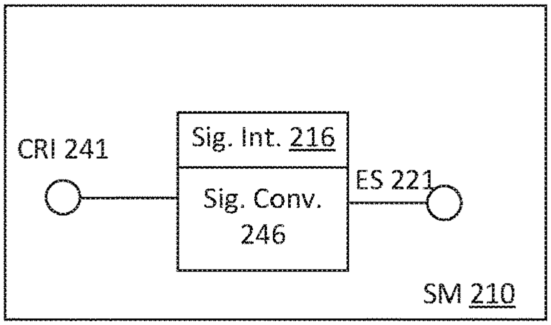
FIG. 2B through FIG. 2E illustrate variations of a signal interface, for use with storage devices such as described with examples of FIG. 1 and FIG. 2A.

FIG. 2B illustrates a first example of a signal interface for a storage module 210. As shown in FIG. 2B, each storage device 210 may be implemented so that the signal interface 216 generates an electrical input for the memory resource 218, using power drawn from, for example, the call receiver 212 when the call receiver 212 makes the call connection. The call receiver 212 may, for example, activate to generate a call receiver input 241 when an incoming phone is received. The signal interface 216 includes a signal converter 246, corresponding to, for example, circuit elements which convert the call receiver input 241 to the electrical input 221. The signal converter 246 can, for example, shape the call receiver input 241 and/or set the voltage value of the electrical input 221 based on the requirements of the memory resource 218. Once the call is received, the signal interface 216 signals the electrical input 221 over the signal line 219 to the memory resource 218, so that the memory resource is in the on-state. As described in greater detail, when the memory resource 218 is in the on-state, the memory resource 218 is accessible to a network communication channel, represented by IP channel 231. Conversely, when the memory resource 218 is in the off-state, the memory resource 218 is not active, and/or not connected to the IP channel 231.

Figure 2C:
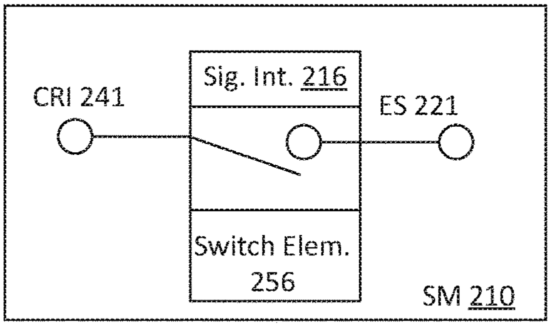

FIG. 2C illustrates another example of a signal interface for a storage module 210. In an example of FIG. 2C, the storage device 200 implements the signal interface 216 to include a switching mechanism 256 that is triggered to switch states by the call receiver 212, based on the call receiver input 241 (e.g., based on whether the incoming call is received). Prior to the incoming telephone call, the signal interface 216 may be an open switch (as shown in FIG. 2C), and once the telephone call is received by the call receiver 212, the switching mechanism 256 is closed. By way of example, the storage module 210 may use a battery or other power source to provide electrical input to the memory resource 218 over the signal line 219 when the signal interface 216 is a closed switch.

Figure 2D:
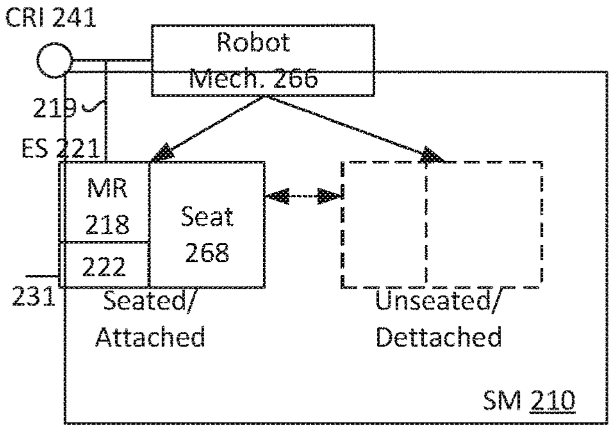

FIG. 2D illustrates another variation of a signal interface for a storage module 210. In an example of FIG. 2D, each storage module 210 implements the signal interface 216 to include a robotic mechanism 266 that includes a seat 268 (e.g., housing element) that moves (e.g., translates, rotates) or otherwise positions (e.g., aligns, orients, etc.) the memory resource 218 and/or signal line 219 with respect to one another. The robotic mechanism 266 can, for example, move the memory resource 218 (as well as the memory microprocessor 222 and IP channel 231) between a seated and unseated position. In the seated position, the memory resource 218 connects to the signal line 219 to receive electrical input 221. The electrical input 221 may be provided by various sources, such as by an external power source or battery. Thus, depending on implementation, the electrical input 221 can be persistent, or intermittent (e.g., when the call receiver 212 receives an incoming call). In such an example, the robotic mechanism 266 may maintain the seat 268 in the unseated position (or detached state), such that an airgap exists between the memory resource 218 and the signal line 219 (from which the electrical input 221 is provided). Once the telephone call is received, the robotic mechanism 266 moves the seat 268 and the memory resource 218 relative to the signal line 219 into the seated or attached state, so that the memory resource 218 switch receives electrical input 221.

Figure 2E:
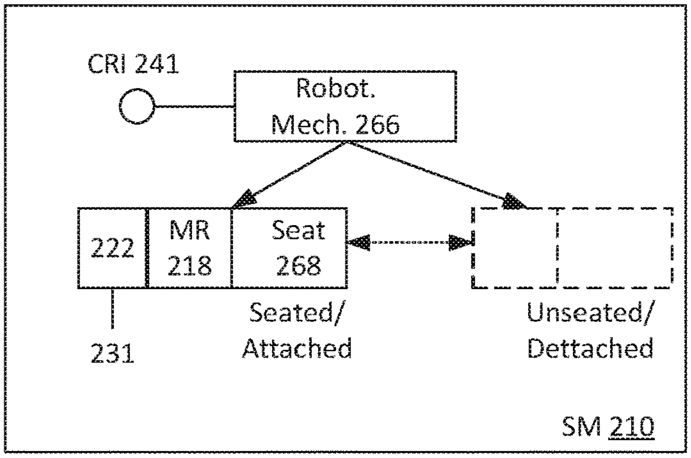

FIG. 2E illustrates another variation of a signal interface for a storage module 210. In FIG. 2E, each storage device 200 implements the signal interface 216 to include the robotic mechanism 266 connecting the memory resource 218 to the memory microprocessor 222 and/or IP channel 231 when in the seated position. By default, the robotic mechanism 266 may keep the seat 268 unseated or detached, until the call receiver input 241 is received. The call receiver input 241 triggers the robotic mechanism 266 to move the seat 268 from the unseated position (or detached state) to the seated and attached state. As described with an example of FIG. 2D, in one variation, the memory resource 218 may only receive electrical input 221 when in the seated position. As an addition or variation, FIG. 2E illustrates an example in which the memory resource 218 connects to the memory microprocessor 222 and IP channel 231 only when the seat 268 is in the seated position. This, when in the seated position, the memory resource 218 may be remotely accessible (e.g., for read and write operations) via the IP channel 231 and memory microprocessor 222. As with other examples, the duration of the seated position may be based on the call receiver input 241 (e.g., duration of incoming call). Once termination is signaled, the robotic mechanism 266 may reposition or otherwise move the seat 268 so that the memory resource 218 is not accessible via the IP channel 231.

While some examples of FIG. 2A through 2E provide for access to the memory resource 218 to be terminated based on the call receiver signal 241 (e.g., while incoming call connection is present, or call is terminated), in variations, access to the memory resource 218 may be terminated based on the occurrence of other conditions. In an example, signal interface 216 may cause the switching element (e.g., see FIG. 2C) or robotic mechanism 266 to switch states or positions in response to the occurrence of one or more multiple conditions, such as, for example, (i) a timer condition (e.g., initiated when the call receiver 212 receives incoming call, or terminates incoming call); and/or (ii) user command, provided by, for example, DTMF input or through the IP channel 231.

With further reference to an example of FIG. 2A, the authentication component 214 can include logic to authenticate an incoming call 211. The authentication component 214 may authenticate an incoming call as a trigger signal to activate the memory resource 218 based on, for example, caller information (e.g., telephone number of caller) or other metadata associated with the incoming telephone call. In variations, when the call receiver 212 connects to an incoming telephone call (specifying the corresponding telephone number associated with the storage device), the authentication component 214 uses audio information to authenticate the telephone call as the trigger signal for activating the memory resource 218. By way of example, the audio information may correspond to, for example, a voice signal or pattern, which the authentication component 214 may recognize as belonging to a specific authorized caller. Once recognized, the authentication component 214 may authenticate the incoming telephone call before the signal interface 216 is triggered to switch the memory resource 218 to the on-state.

In variations, the audio information may correspond to a spoken utterance, a dual tone multi-frequency signal ("DTMF") or another audio signal which can be recognized, or otherwise correlated to an authentication input. If the incoming telephone call is authenticated, the authentication component 214 may generate an electrical signal 221 via the signal interface 216 to activate (or switch to on-state) the memory resource 218. While the memory resource 218 is in the on-state with application of the electrical signal 221, the memory resource 218 may be accessible to read and write operations via the IP channel 231.

In some examples, read and/or write operations may be communicated for memory resource 218 when in the on-state, using a memory microprocessor 222. In an example, the memory microprocessor 222 can process read and/or write operations received through the incoming telephone call 211. For example, the read and/or operation can be communicated through a pattern or sequence of tones of the incoming telephone call 211.

As a variation, the memory microprocessor 222 can receive read and/or write operations and communicate respective responses to the operations through an alternative data channel (e.g., IP channel 231). In such examples, the network connection may thus be active when the memory resource 218 is in the on-state. In some variations, the memory microprocessor 222 may include additional security logic, such as additional authentication logic to authenticate a user who attempts to access the memory resource 218 while it is active.

Figure 3:
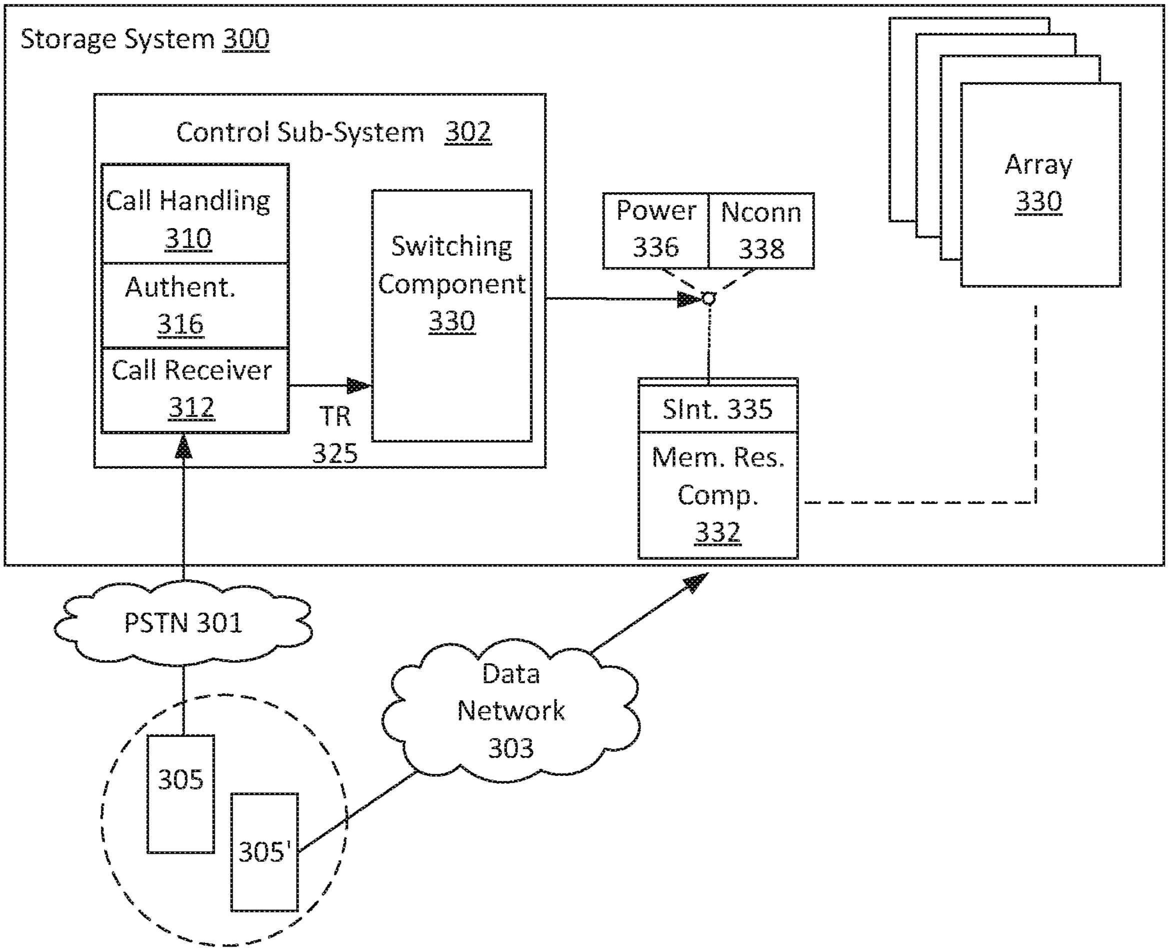
FIG. 3 illustrates an example method for storing sensitive data using a discrete on-demand memory resource.

FIG. 3 illustrates another example of a storage system, according to one or more embodiments. In an example of FIG. 3, a storage system 300 includes a control sub-system 302 and an array of memory resource components 330. In an example of FIG. 3, the array 330 includes a plurality of memory resource components 332, with each memory resource component being associated with a specific account and/or identifier. In examples, the memory resource components 332 of the array 330 are disabled by default. The control sub-system 302 uses an incoming phone call from a user to enable a corresponding memory resource component 332 associated with the incoming call to be accessible to the user via a data network 303.

In examples, the memory resource components 332 of the array 330 are physically separated from one another. In variations, each memory resource component 332 includes a discrete memory resource, such as described with an example of FIG. 1. In some variations, the memory resource component 332 can include an associated memory access controller that can receive read operation commands from another computing source, In variations, the memory resource component 332 can correspond to a micro-computer. In other examples, the memory resource components 332 can share resources, such as a central processor that accesses discrete memory resources of the respective memory resource components 332.

According to examples, the control sub-system 302 includes a call handling component 310 to receive incoming calls, and a switching component 320 that enables network access to specific memory resource component 332 of the array 330 that are identified by respective incoming calls. As described with some examples, the call handling component 310 can identify a memory resource component 332 of the array 330 from an incoming call initiated by the user device 305. The switching component 320 can implement a switching operation or action to enable the memory resource component 332 identified by the incoming call to be accessible over a data network (e.g., IP network, the Internet).

In some examples, the switching component 320 is implemented as a mechanism that closes an airgap, in order to enable an identified memory resource component 330 to be accessible on a data network. In variations, the switching component 320 is implemented as a mechanism that electrically connects the identified memory resource component 332.

In more detail, the call handling component 310 may be accessible to user devices (or collection of user devices) over a telephony connection. In some examples, the call handling component 310 is accessible over a Public Switch Telephony Network ("PSTN") 201 to receive telephony calls from a telephony-enabled user device 305. The call handling component 310 can include, for example, a receiver 312 to receive the incoming call. The receiver 312 can initiate one or more processes in response to the incoming call. Additionally, the receiver 312 can convert the incoming call to a digital output that identifies a specific account.

Once the call is authenticated, a memory resource component 332 that is associated with an account of the user can be enabled for access over a data network (e.g., IP network, Internet). In examples, the memory resource component 332 can be switched from an unconnected state to a connected or activated state, where, for example, network connectivity and/or power is provided to the memory resource component 332. Thus, for example, the user can operate a computing device (e.g., the telephony-enabled computing device 332, or another user device) to access the memory resource component 332 over the data network.

In some variations, the receiver 312 includes caller authentication logic 316. The receiver 312 can execute the caller authentication logic 316 to authenticate the caller based on one or more signal characteristics carried by the incoming call signal. The caller authentication logic 316 can include, for example an authentication data store that stores authentication tokens (e.g., number passcode, password, answers to secret questions, etc.) for each user account (e.g., for individual account identifiers). Depending on implementation, the receiver 312 can identify one or more authentication data items and an account identifier from an incoming call, and then perform a comparison operation to compare the authentication item with a stored token of the account identifier. In one implementation, the caller authentication logic 316 processes a sequence of acoustic tones, where the sequence correlates to numbers of a dial pad that a user is interfacing with on the respective user device 305. In another implementation, the receiver 312 implements the caller authentication logic 316 to perform recognition of a user's voice input, to determine, for example, utterances of the user corresponding to a number, password, or secret. Still further, the receiver 312 can implement the caller authentication logic 316 to recognize the user's voice.

Still further, the memory resource component 332 of the array 330 includes a switch interface 335 that can selectively link to at least one of a power resource 336 or a network communication resource 338. The power resource 336 can correspond to a battery, a power inlet, or a power bridge that is shared with other memory resource components 332 of the array 330. In some variations, the network communication resource 338 can correspond to a data port and/or transceiver for receiving network communications over a data network (e.g., Internet Protocol (IP) network, the Internet). In other variations, the network communication resource 338 can include a data port and link for an external gateway to a data network (e.g., the Internet).

The call handling component 310 can respond to an incoming call by generating a trigger signal 325 for the switching component 320. According to examples, the trigger signal 325 (*i*) identifies the particular memory resource component 332 that is associated with an identifier provided by the incoming call, and (ii) forms a connection 334 (e.g., closes an airgap or electrical switch) to link the memory resource component 332 to the power resource and/or the network communication resource 338 via the switch interface 335 of the memory resource component 332. The connection 335 enables the identified memory resource component 332 to be accessed by the user device 305 over the data network 303. In some variations, the switching component 320 can be implemented as a mechanism that responds to the trigger signal 325 by forming the connection 335 using the switch interface 335 of the identified memory resource component 332 and the corresponding network communication resource 338. The connection 335 enables the user to access the memory resource component 332 over the corresponding data network 303 (e.g., IP network, the Internet, etc.).

As an addition or variation, the switching component 320 can be implemented as a mechanism that responds to the trigger signal 325 by forming the connection 335 to connect the memory resource component 332 to the power resource 336. In such examples, the switching component 320 forms the connection 335 to enable the memory resource component 332 to be accessible (e.g., available for read operations) using a network communication resource of that memory resource component 332.

In some examples, the switching component 320 can include timing logic that maintains the formed connection for the identified memory resource component 332 for a duration of time following, for example, the respective incoming call connection being made or terminated. As an addition or variation, the switching component 320 can communicate with the receiver 312 to detect when the incoming call is received and terminated. The switching component 320 can then maintain the connection that enables access to the identified memory resource component 330 for a duration that correlates to when the incoming call is received and terminated. Still further, in other variations, the switching component 320 can implement logic to form the connection for enabling the identified memory resource component 332 upon the respective incoming call being received. The switching component 320 can terminate the connection for enabling the memory resource component 332 upon the receiver 312 receiving a second call that specifies the identified memory resource 332.

In some examples, the call handling component 310 can be implemented as a server, or combination of servers, which match an incoming phone number to a port identifier that is assigned to the memory resource component 332. The call handling component 310 can implement the authentication logic 316 to authenticate the caller. Once the caller is authenticated, the call handling component 310 generates the trigger signal 325 for the switching component 320. In one implementation, the switching component 320 responds to the trigger signal 325 by connecting the network communication resource 338 to the port identified by the incoming call. The switching component 320 can, for example, implement an A/B gang relay that links the port corresponding to the identified memory resource component 332 to the network communication resource 338.

Figure 4:
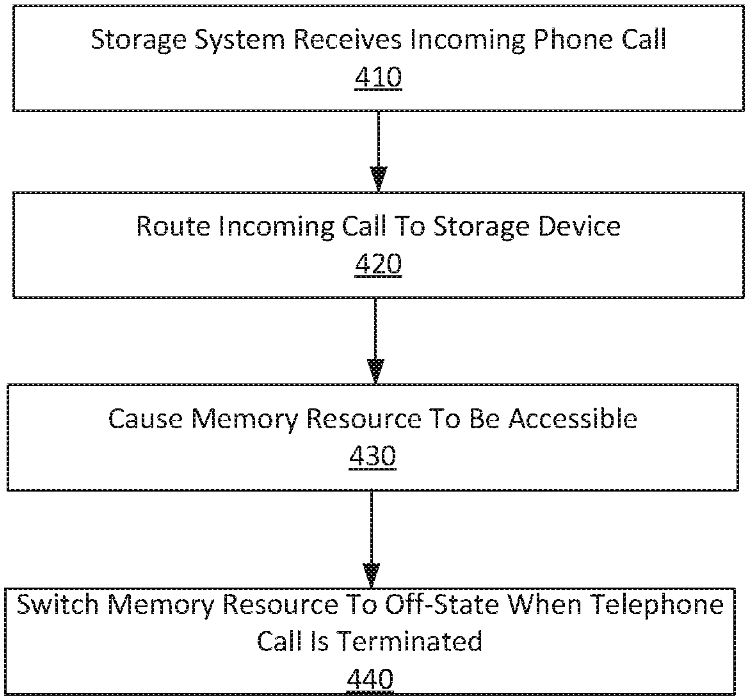
FIG. 4 illustrates a method for providing a storage module that is inaccessible until remotely activated using a non-IP network communication channel or link.

FIG. 4 illustrates a method for providing a storage module that is inaccessible until remotely activated using a non-IP network communication channel or link. A method such as described with an example of FIG. 4 may be implemented using, for example, a storage system such as described with an example of FIG. 2A through FIG. 2E. Accordingly, reference may be made to elements of FIG. 2A through FIG. 2E for purpose of illustrating suitable components for performing a step or sub-step being described.

With respect to an example of FIG. 4, storage system 200 receives an incoming telephone call (410). The incoming telephone call may be received over the PSTN network. In variations, the storage system 200 receives an incoming communication over another type of non-IP network. For example, the storage system 200 may directly interface with an analog network or communication medium, which in turn may be accessible to other types of networks (e.g., the Internet).

The system 200 may route the incoming telephone call to one of multiple available storage modules 210, based on the telephone number associated with the incoming telephone call (420). Once the telephone call is routed and the call connection is made, the memory resource 218 of the selected storage module 210 may be switched from an unconnected state to a connected or activated state. In one implementation, the storage module 210 is powered when in the connected or activated state. As an addition or variation, the storage module 210 is accessible over an IP-network (e.g., the Internet) when in the connected or activated state. Conversely, the storage module 210 may be unconnected or without power when the unconnected state.

In one example, the storage module 210 uses the incoming telephone call to supply electrical input to the memory resource 218, thereby causing the memory resource 218 to become available (e.g., in the on-state). For example, the signal interface 216 can draw power from the call receiver 212 when the incoming telephone call is received, and the drawn power can be signaled over the electrical input line 219 to the memory resource 218.

In another example, the storage module 210 physically manipulates the memory resource to make contact with an electrical input line. For example, the signal interface 216 may correspond to a robotic component that manipulates the orientation of the memory resource 218 relative to the storage module 210, in order to cause physical contact between the electrical input line 219 (or switch thereto) and the memory resource 218.

The electrical input signal causes the memory resource 218 to be accessible for a duration that can be determined by the incoming telephone call (430). When accessible, the memory resource 218 is accessible over an IP channel 231, so that it can be read or written to by a remote terminal. In variations, the duration can be determined from the telephone call, such as from user input (e.g., user enters DTMF command). Still further, the memory resource 218 may be accessible for a duration that is determined by the user input, received from, for example, the IP channel 231. Alternatively, the duration may be determined from a timer and/or predetermined condition.

In some examples, the telephone call to the storage module 210 is terminated, the memory resource 218 is switched to the off-state (440). In one example, the signal interface 216 terminates the electrical input provided over the electrical input line 219, as the signal interface 216 can no longer draw power from the call receiver 212. In a variation, the signal interface 216 responds to termination of the telephone call by manipulating the memory resource 218 relative to the storage device, to disconnect or force an air gap with an electrical input signal line. In this way, once the telephone call is terminated, the memory resource is switched to the off-state, so that it is no longer accessible over the IP channel 231.

While some examples provide for access to the storage device 200 to be terminated based on the incoming call (e.g., termination of incoming call causes termination of access to the memory resource), in variation, the termination to the memory resource 218 may be provided by other triggers or conditions. For example, access to the memory resource 218 may be terminated when the user makes a second call that is received by the call receiver 212. Alternatively, access to the memory resource 218 may be terminated by a timer condition (e.g., timer initiated when incoming call is received or terminated), after which access to the memory resource 218 is terminated. Still further, access to the memory resource 218 may be terminated in response to the user signaling a command over the IP channel 231 when access is present.

Figure 5:
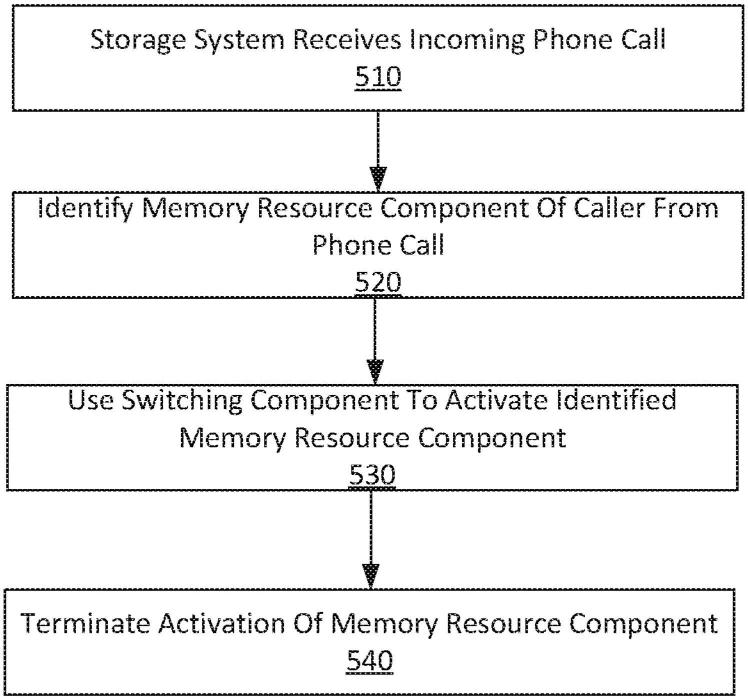
FIG. 5 illustrates a method for managing an array of memory resource components, where each memory resource component of the array is selectively activated through an initial connection made through a non-IP network channel or link.

FIG. 5 illustrates a method for managing an array of memory resource components, where each memory resource component of the array is selectively activated (e.g., switched to an on-state or otherwise connected to a network link) through an initial connection made through a non-IP network channel or link. A method such as described with an example of FIG. 5 may be implemented using, for example, a system such as described with an example of FIG. 3. Accordingly, reference may be made to elements of FIG. 3 for purpose of illustrating suitable components for performing a step or sub-step being described.

With respect to an example of FIG. 5, storage system 200 receives an incoming telephone call over the PSTN network, or alternatively, over another type of non-IP network (510). For example, the control sub-system 302 of the storage system 300 directly interfaces with an analog network or other communication medium, which in turn may be accessible to other types of networks (e.g., the Internet). By way of example, the incoming call may be received on a server control sub-system 302 that manages incoming phone calls, separate from the array of memory resource components 330.

Based on information determined from the call, the system 200 identifies the memory resource component 332 associated with the caller (520). In some examples, the memory resource component 332 is identified from the phone number that is used to access the storage system 300. As an addition or variation, the storage system 300 can use input from the user (e.g., sequence code, voice authentication) to authenticate that the caller is to have access to the identified memory resource component 332.

According to an example, the control sub-system 302 uses a switching component 320 to activate the memory resource component 332 identified by the incoming call (530). In some examples, the switching component 320 provides an airgap closure to each of multiple memory resources components 332 of the array 330. For example, each air-gap closure may be implemented using an A/B gangway having a physical layer relay that can be programmatically triggered between open and closed states. The switching component 320 can utilize a switch management component (e.g., SWITCHMASTER R6100) to house and manage each switch, so that activation results in closure of the airgap corresponding to a particular memory resource component 332 identified by the incoming call. In some examples, the activation results in the corresponding memory resource component 332 being connected to the network communication resource 338 (e.g., Internet gateway), thereby enabling the memory resource component 332 to be accessible over the data network 303.

The control sub-system 302 may further terminate activation in response to a condition or event (540). For example, the control sub-system 302 may activate a particular memory resource component in response to receipt of a corresponding telephone call (e.g., phone call using phone number of particular memory resource 332). The activation of the memory resource 332 may also initiate a timer that deactivates the memory resource component 332 after a designated time period. As an addition or variation, the control sub-system 302 can deactivate the identified memory resource component 332 upon receiving a second phone call for the same phone number of the activated memory resource 332.

Client System and User Devices

Figure 6:
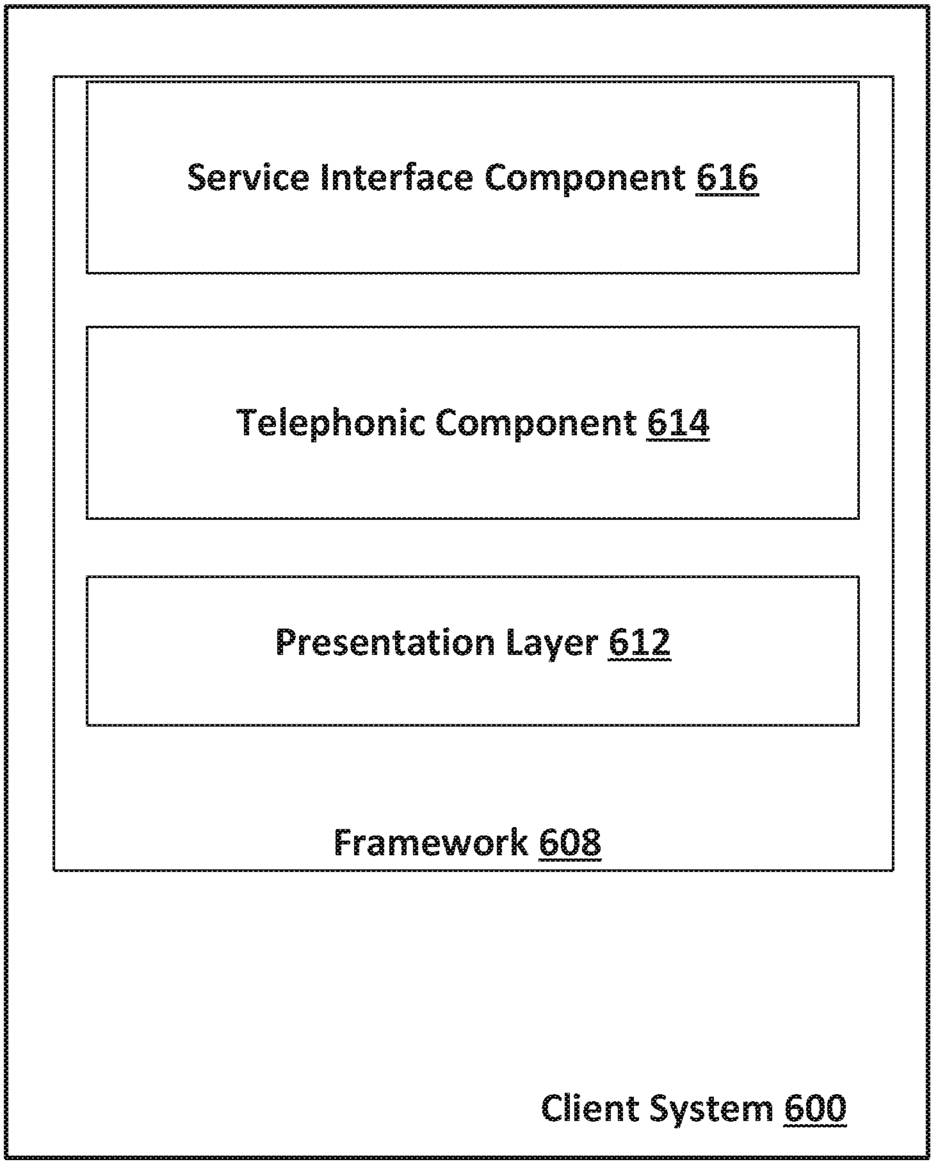
FIG. 6 illustrates a client system to access a remote memory resource component of a user account, according to one or more examples.

FIG. 6 illustrates a client system to access a remote memory resource component of a user account, according to one or more examples. A user of client system 600 may have authorization to access a memory resource component that is maintained by a storage system, such as described with an example of FIG. 3. Accordingly, reference may be made to elements of FIG. 3 for purpose of illustrating suitable components for use in implementing or using functionality and components described with an example of FIG. 6.

In an example, the client system 600 can be implemented by one or multiple computing devices of the user. For example, the client system 600 can be implemented using a telephony-enabled device and a browser-enabled device. In variations, the client system 600 can be implemented by a multi-purpose computing device that is capable of telephony and IP communications. According to examples, the client system 600 can include a programmatic component or interface that is provided for use with a service of storage system 300. For example, the client system 600 can be implemented using a service application that executes on the user's mobile computing devices. In variations, the client system 600 can be implemented by a platform, including applications, plug-ins, or other programmatic components that operate on multiple devices of the user.

According to an example, the client system 600 includes a presentation layer 612, a telephonic component 614, and a service interface component 616. Based on implementation, the components can be implemented through, for example, a service application on a single device, or distributed in whole or in part on multiple devices of a user. In some variations, the client system 600 also includes a framework 608, which implements rules with respect to the operations of the respective components.

In examples, the service interface component 616 can utilize one or more IP networks (e.g., Internet) to establish a communication channel with the storage system 300. In implementation, the service interface component 616 can include or be implemented as a browser component. In variations, the service interface component 616 can be implemented as an interface (e.g., plug-in, extension, etc.) for a local third-party browser of the client system 600. In such examples, the framework 608 can restrict use of the operations of the service interface component 616, such that the service interface component 616 has, or can be operated in a mode which is dedicated for communications with the storage system 300, under rules of framework 608. By way of example, the framework 608 can implement rules that result in functionality such as (i) dedicating the service interface component 616 to access a designated network site or location, as provided by the storage system 300 or other approved source; (ii) implementing encryption for any communication channel or exchange with the storage system 300; (iii) concealing the network address used to access the memory resource component 332 of the user; and/or (iv) restricting access to the service interface component 616 and/or storage system 300 without additional authentication being provided by a user (e.g., login and password credentials from user, biometric input through device of the service interface component 616, etc.).

In examples, the telephonic component 614 can enable telephony communications using a cellular or wireless receiver of a local user device. In variations, telephonic component 614 can be implemented as an interface to a phone application or resource for making a call connection on the computing device. In variations, the telephonic component 614 can interface with a voice service, such as a cellular voice service or a voice over Internet Protocol (VOIP) service. The framework 608 can also implement rules that restrict use or functionality of the telephony component 614. For example, the framework 608 can implement rules to (i) specify a phone number, and/or source for obtaining the phone number that can be automatically dialed through the presentation layer 612, to access the storage network 300; (ii) restricting use of the telephony component 614 to making call connections for only the designated phone number(s); and/or (iii) concealing the phone number that is being called from the user or other source.

In examples, the telephony component 614 can automate or facilitate additional functionality. For example, the telephonic component 614 can receive, or decode a signal from the storage system 300 that identifies a credential or the network address that the service interface component 616 is to use. In variations, the telephonic component 614 can also implement an authentication process using a local login or biometric credential of the user. The telephonic component 614 can also trigger execution of the service interface component 616, such that, for example, the service interface component 616 accesses the memory resource component 332 (or a service of the 300) using the corresponding network address, once a predetermined event is detected through the telephonic component 614 (e.g., the telephonic component 614 terminating initial phone call, the telephonic component 614 providing authentication credentials over call connection, etc.). Still further, the telephonic component 614 can receive or obtain the network address for the service interface component 616.

In variations, the presentation layer 612 can be provided as part of the platform or application(s) that run on device(s) of the client system 600. In an example, the client system 600 provides a call feature that the user can interact with in order to initiate a phone call to the remote site of the storage system 300 (or related service). Accordingly, in some examples, the user selects or otherwise interacts with the call feature provided through the presentation layer 612, without specifying a phone number that is linked to a remote site. In some examples, the service can change the phone number associated with the particular memory resource component 332 of the user. Moreover, in some variations, the phone number can be specific to the account or device(s) of the user. In variations, once the user interaction is received, the telephonic component 614 automatically identifies the phone number from an application memory. For example, the client system 600 can establish a background process that causes, for example, a service application or other program running on the user's mobile device to periodically receive check and/or update the current phone number that is to be used by the particular user. In other variations, the service application or other program of the client system 600 can acquire the phone number as a response to an event or condition, such as the user indicating a desire to access protected data stored with a service that uses or is provided with the storage system 300.

In examples, the client system 600 can initiate a timer based on a condition or event such as the call connection being made or terminated. In some examples, the service interface component 616 is able to use the network address to access the memory resource component 332 during a defined duration that is defined in part by the timer. As an addition or variation, the service interface component 616 can be enabled for a duration that extends until the user operates the telephonic interface 614 to make a second call connection to the service. While the service interface component 616 is enabled, the client system 600 can use the communication channel to access and use the memory resource component.

Figure 7:
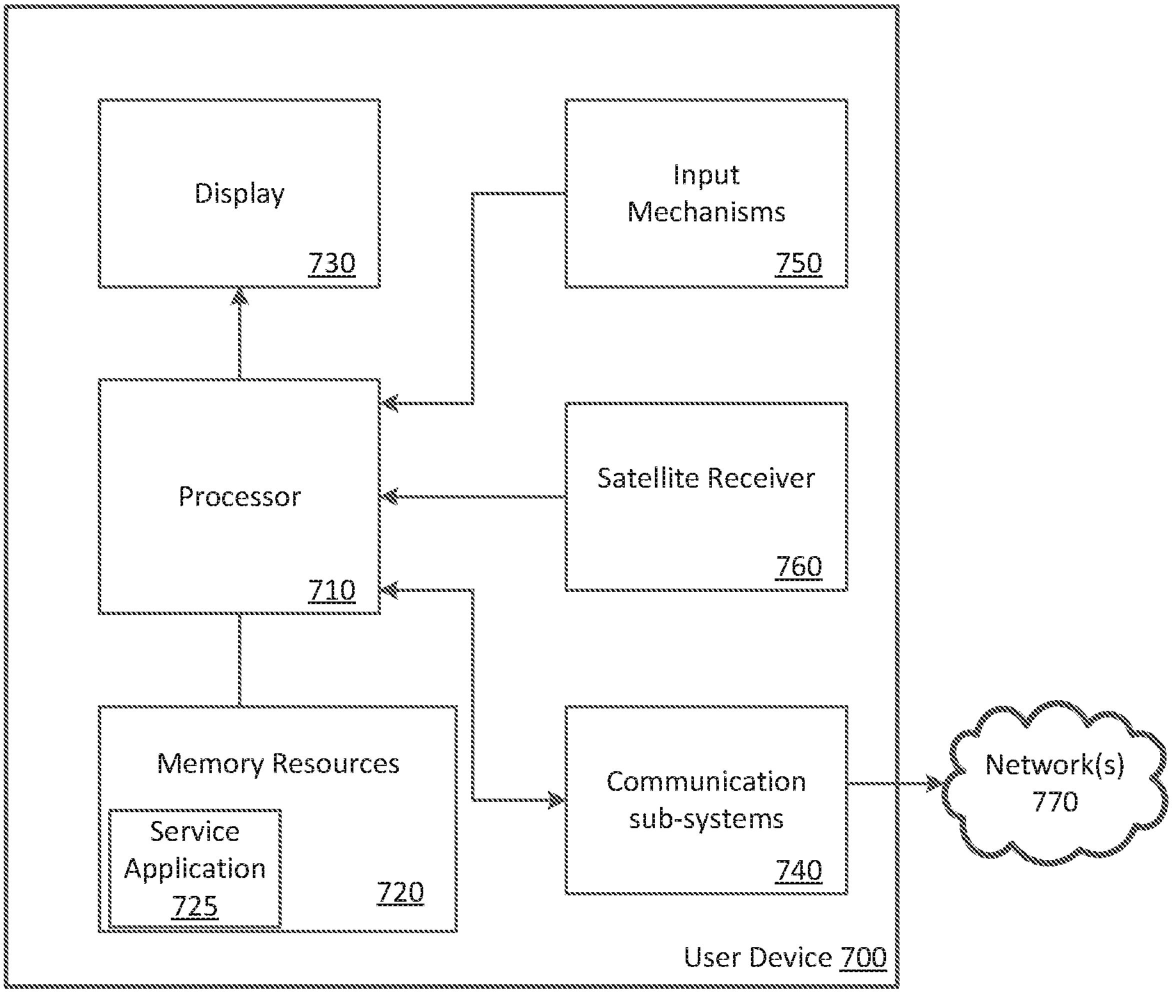
FIG. 7 is a block diagram that illustrates a computing device upon which examples described herein may be implemented.

FIG. 7 is a block diagram that illustrates a computing device upon which examples described herein may be implemented. In one embodiment, a computing device 700 may correspond to a mobile computing device, such as a cellular device that is capable of telephony, messaging, and data services. By way of example, the computing device 700 can correspond to a smartphone (or feature phone) on which an application ("app") can execute. In variations, the user device 700 can correspond to a tablet, ultraportable computing device, laptop or desktop computer.

The computing device 700 includes a processor 710, memory resources 720, a display device 730 (e.g., such as a touch-sensitive display device), one or more communication sub-systems 740 (including wireless communication sub-systems), one or more sensors 750 (e.g., accelerometer, gyroscope, barometer, altimeter, microphone, camera), and one or more location detection mechanisms (e.g., GPS component) 760. In one example, at least one of the communication sub-systems 740 sends and receives cellular data over both data channels (e.g., IP networks) and voice channels. The communications sub-systems 740 can include a cellular transceiver and one or more short-range wireless transceivers to enable (i) placement of a phone call, and (ii) communication with a remote service that utilizes a storage system such as described with FIG. 1 through FIG. 3.

The memory resources 720 can also store instructions for a service application 725 that can implement a client system for remotely accessing a memory resource component of a user, as described by examples of FIG. 6. In an example, the service application 725 initiates and automates communications with, for example, storage system 300. For example, the processor 710 can be configured with software and/or other logic to perform one or more processes, steps, and other functions described with client system 600 (see FIG. 6). For example, the service application 725 can run to provide telephonic component 614 (see FIG. 6) and service interface component 616 (see FIG. 6). Additionally, the service application 725 can provide presentation layer 612 (see FIG. 6) to enable, for example, programmatic use of a storage service provided with the storage system 300.

When installed and running on the mobile computing device 700, the service application 725 can implement functionality of client system 600, such as described by examples of FIG. 6. In examples, the service application 725 can be associated with an account identifier 711 and/or other credential information 715 that is specific to the user, user account or device (e.g., mobile device phone number).

The service application 725 can include processes for implementing the telephonic component 614 and the service interface component 616, as described with examples of FIG. 6. In implementation, the service application 725 can be configured to enable the service interface component 616 in response to an event and/or condition that is caused by the telephonic process 614, using the phone number to make the call connection. For example, the service application 725 can enable the service interface component 616 in response to one or more events that include the call connection being made, the user providing additional authentication information using the call connection, and/or the user terminating the call connection. In examples, the service interface component 616 is enabled once the user is authenticated during the phone call. For example, the service can communicate the network address to the application, and the service interface component 616 can utilize the address to access the remote service once the user is authenticated during the call connection. The service interface component 616 can establish, for example, an Internet Protocol data communication channel with the service.

In examples, a user can access data stored on the user's memory resource component 332, as hosted by the storage system 300, by launching the service application 725. Once launched, the service application 725 automatically or programmatically (e.g., in response to a single user input) makes a call connection to the storage system 300, using a unique phone number that is specific to the user or account. From the call connection, the user can be provided a duration of time during which the service application 725 can be used to access the memory resource component 332. In variations, the user can utilize a phone number that contacts the 300, and then subsequently provide additional authentication information to enable network access to the memory resource component 332 of the user or account. Once access to the memory resource component 332 is enabled, the service application 725 can be used to access the memory resource component 332. The service application 725 can, for example, implement a browser process to make the network connection with the memory resource component 332, by automatically acquiring and/or using the network address for locating the memory resource component 332 over one or more IP networks.

While examples provide for the client system 600 and/or mobile computing device 700 to be operated by a user, in variations, the user can correspond to a group of users (e.g., enterprise). In such variations, an administrator, for example, can provide the mobile computing device 700 with a set of credentials and/or other identifiers (e.g., phone number for use in contacting the storage system 300). The administrator can also provide the individual user with additional credentials for locally authenticating the user, and/or authenticating the user with the storage system 300. In this way, the memory resource component 332 can be shared amongst multiple users.

In examples, the service application 725 can generate a user interface that indicates a status of a memory resource component 332 that is assigned to the user. The user can interact with the service application 725 to activate the memory resource component 732. For example, the user can initiate a trigger for the telephonic component 614 (see FIG. 6) through the service application 725 to cause the mobile computing device 700 to initiate a telephony call to a storage service that is provided with storage system 300. In variations, the service application 725 can execute to generate DTMF tones (or other analog input) for the storage service. In this way, the service application 725 can identify and/or authenticate the user to the storage service. Once the user is identified and authenticated, the service application 725 can use the service interface component 616 to establish a data connection with the storage service. The data connection can be used to generate content for the presentation layer 612 (see FIG. 6) to, for example, view contents of the memory resource component, such as, for example, a value of a user's current cryptocurrency.

In some variations, the operations of the service application 725 following an initial user trigger can be substantially automated. For example, the service application 725 can monitor the telephony connection for an acknowledgement that the memory resource component 332 that is assigned to the user has been activated, then automatically perform operations that establish the connection with the memory resource component 332 over the data network. Likewise, the computing device 700 may execute to monitor for one or more events (e.g., passage of time) that result in termination of the memory resource activation, and/or cause the mobile computing device to generate a command to terminate the activation.

Figure 8:
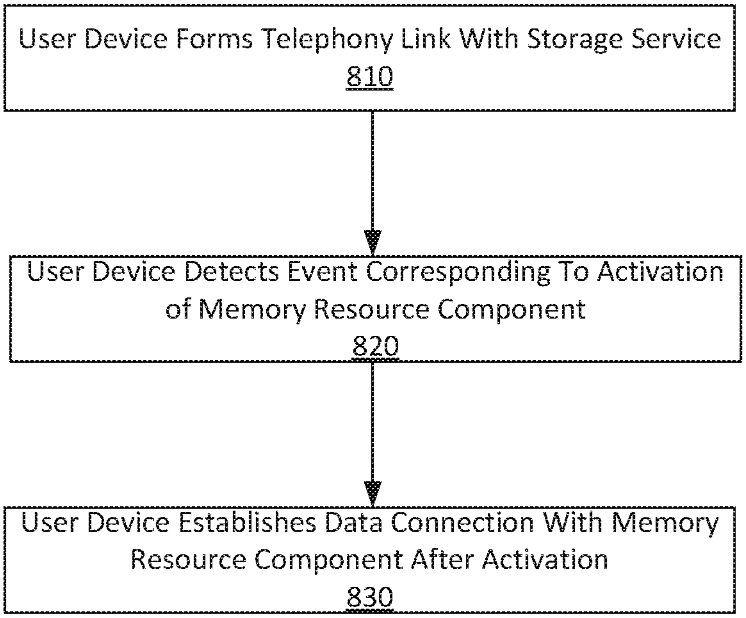
FIG. 8 illustrates a method for operating a computing device of a user to access a service that provides a memory resource component to store sensitive data of the user, according to one or more examples.

FIG. 8 illustrates a method for operating a computing device of a user to access a service that provides a memory resource component to store sensitive data of the user, according to one or more examples. A method such as described with an example of FIG. 8 may be implemented using, for example, a client system such as described with an example of FIG. 6, or a mobile computing device such as described with an example of FIG. 7. Accordingly, reference may be made to elements of FIG. 6 and FIG. 7 for purpose of illustrating suitable components for performing a step or sub-step being described.

With reference to an example of FIG. 8, a user can operate client system 600 to make a call connection (e.g., place a phone call) with a storage service that is provided in conjunction with storage system 300 (810). In examples, the client system 600 can be implemented using the mobile computing device 700, executing the service application 725. In such examples, the service application 725 can be used to place a phone call to a storage service provided by the storage system 300. using telephony resources of the computing device. For example, the service application 725 may execute to transparently initiate a phone call via phone application and cellular telephony capabilities of the computing device. In variations, the user may place the phone call to store system 300 as a separate action or event. For example, the user can place the phone call to storage system 300 before the user launches the service application 725. Still further, in other variations, the user may use a first device (e.g., mobile computing device 700) to make the call connection, and a second device (e.g., browser device) to form a communication channel over one or more IP networks. In either of the variations, the memory resource component 332 that corresponds to the phone number used for placement of the phone call can be identified and activated as a result of the call connection.

When the call connection is made, the user and/or the mobile computing device 700 can specify additional input to authenticate the user. For example, the computing device 700 can automatically generate a sequence of tones that correspond to a passcode of the user. Alternatively, the user may be prompted to provide an utterance, either by the computing device 700 and/or by the system 300.

In some examples, the service application 725 can execute on the computing device 700 to detect one or more events corresponding to activation of the memory resource component 332, as identified by the phone number and/or other input provided over the telephony link of the call connection (820). The detected event may correspond to, or indicate the availability of the memory resource component 332. In some examples, the control sub-system 302 generate one or more audible sounds to programmatically communicate the status of the memory resource component 332 which is to be activated. The computing device 700 may execute the service application 725 to detect and interpret the audible communications generated by, for example, the control sub-system 302.

Once the computing device 700 detects the event (e.g., memory resource component 332 is activated), the computing device 700 can establish a communication channel over the data network 303 (e.g., the Internet) with the identified memory resource component 332 (830). In some examples, the establishment of the connection over the data network 303 can be done automatically, such as in response to detecting audible acknowledgment over the telephony link that the memory resource 332 for the identified phone number has been activated.

Network Isolation Device

Figure 9:
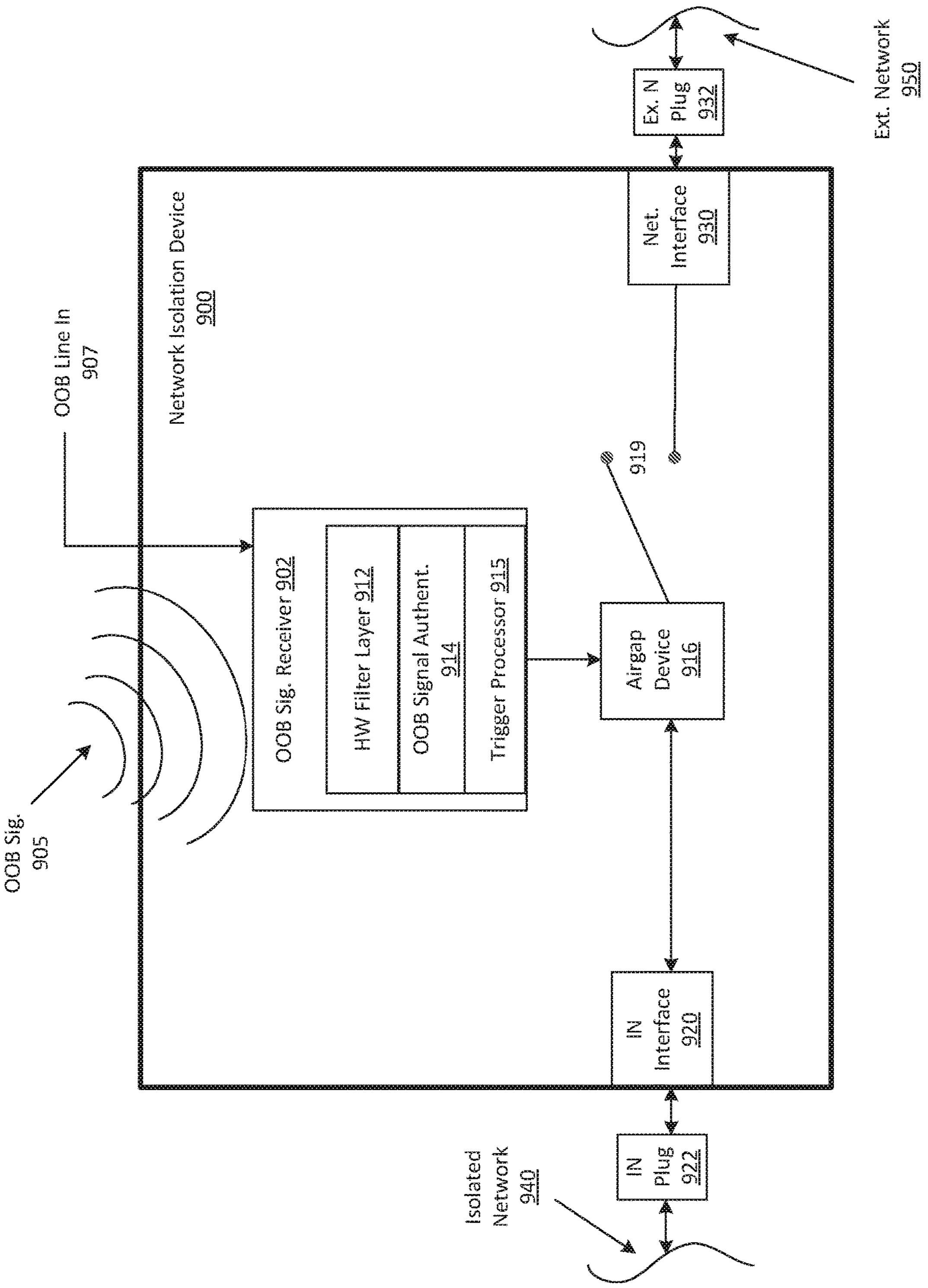
FIG. 9 is a block diagram illustrating a network isolation device, in accordance with examples described herein.

FIG. 9 is a block diagram illustrating a network isolation device 900, in accordance with examples described herein. As provided herein, the air gap-based network isolation device 900 includes hardware componentry for isolating downstream networks and computing devices from external networks 950, such as Internet Protocol-based networks. The network isolation device 900 includes an out-of-band signal receiver 902 coupled to an airgap device 916 (e.g., a mechanical relay, actuator, or optocoupler) that closes and opens a physical air gap 919 in response to an out-of-band wireless signal 905 or an out-of-band signal received through an out-of-band line 907 coupled to the out-of-band signal receiver 902. As provided herein, the "out-of-band" signal can comprise a signal utilizing a different communication protocol that that of the external network 950. For example, when the external network 950 comprises an IP-based network, such as the Internet, the out-of-band signal 905 can comprise any non-IP-based signal, such as a non-IP radio signal, a LoRa signal, an SMS message, a PSTN signal, a cellular signal, and the like.

In various implementations, the out-of-band signal 905 can be wirelessly transmitted or broadcasted from an authorized signal source (e.g., a mobile computing device, a LoRa signal generator, etc.), and can comprise an encrypted communication (e.g., a short message service (SMS) message or a modulated spread spectrum LoRa signal) which can be processed by an out-of-band signal receiver 902 of the network isolation device 900 to control the airgap device 916 that physically opens and closes the air gap 919. Additionally or alternatively, the out-of-band signal can be received through a wire via an out-of-band line 907 coupled to the out-of-band signal receiver 902. In one example, an internal network 940 (e.g., an Ethernet network utilizing an Internet Protocol (IP)) may be isolated from the external network 950 (e.g., the Internet) using the network isolation device 900 as an access point to the internal network 940. As an example, the internal network 940 can be comprised of computing devices, memory resources, and/or other digital assets of any entity that desires increased security that isolates its computing devices from other networks in an on-demand manner using the out-of-band signal authentication techniques described throughout the present disclosure.

The network isolation device 900 can include an internal network interface 920, such as a universal serial bus (USB) port and/or RJ45 port, that connects the network isolation device 900 to the internal network 940. Accordingly, the internal network interface 920 may be mated with a corresponding internal network plug 922 that provides the physical connection to the network isolation device 900. The network isolation device 900 can further include a second network interface 930, such as a universal serial bus (USB) port and/or RJ45 port, that connects the network isolation device 950 to an external network 950 (e.g., the Internet) using a corresponding external network plug 932. As provided herein, the external network 950 and internal network 940 are physically connected and disconnected via an air gap 919 that is opened and closed through control of the airgap device 916 by the signal receiver 902.

As described herein, the signal receiver 902 can include a dedicated hardware signal filter 912 that provides an initial analog authentication layer for an incoming wireless access signal 905 or access signal received via the out-of-band line 907. In some aspects, the hardware signal filter 912 can comprise a specialized chip comprising a hardware representation of an encryption and/or decryption algorithm that prevents unwanted access to signal authentication software executing on the signal receiver 902. Accordingly, a detected signal by the signal receiver 902 may be first processed by the hardware filter 912 before the signal is permitted to be processed by a signal authenticator 914 of the signal receiver 902.

As an addition or an alternative, the signal receiver 900 can include a signal authenticator 914, such as a digital signal processor or other processing device executing authentication or decryption instructions to authenticate the out-of-band access signal. Upon receiving the signal, the signal authenticator 914 can perform an authentication process to determine whether the signal is from an authorized source and/or includes an authorized access code. The signal authenticator 914 may do so using any type of suitable authentication technique(s), a such as code decryption and/or device identifier verification technique.

Once authenticated, a trigger processor 915 of the signal receiver 902 can control the airgap device 916 to close the air gap 919 and connect the internal network 940 to the external network(s) 950. As an on-demand device, the network isolation device 900 can be controlled remotely using any type of out-of-band signal that corresponds to the signal receiver 902. As an example, the signal receiver 902 may receive an SMS message from a particular phone number that includes a specified code for authentication. The hardware signal filter 912 can pre-process the SMS message (e.g., verify that it came from a correct phone number or an authorized device identifier). Upon initial verification by the hardware filter 912, the SMS message may be further processed by the signal authenticator 914 of the signal receiver 902, which can, for example, verify a secondary code embedded in the message (e.g., via a decryption algorithm). Once verified, the signal receiver 902 can control the airgap device 916 to close the air gap 919 and enable access or open the air gap 919 to remove access to the internal network 940.

One particular implementation contemplated is the use of LoRa technology to open and close the air gap 919. LoRa technology involves the use of low power, long range radio frequency transmissions utilizing spread spectrum modulation (e.g., chirp spread spectrum (CSS) modulation) to encode signals. Accordingly, a LoRa signal generator may use common battery power (e.g., AA or AAA batteries) which can power the LoRa signal generator for long periods of time (e.g., years) without replacement. As an example, an enterprise having a sensitive internal network 940 of computing devices, memory resources, and/or other digital assets may utilize a single LoRa signal generator to connect and disconnect its internal network 940 from the external network 950 as needed. The LoRa signal generator can encode an out-of-band LoRa signal 905 using CSS modulation and transmit or broadcast the signal 905 such that it is detectable by the signal receiver 902. The signal receiver 902 then decrypts or decodes the LoRa signal, authenticates the LoRa signal generator and/or the LoRa signal itself, and controls the airgap device 916 to open or close the air gap 919 on-demand.

Methodology

Figure 10:
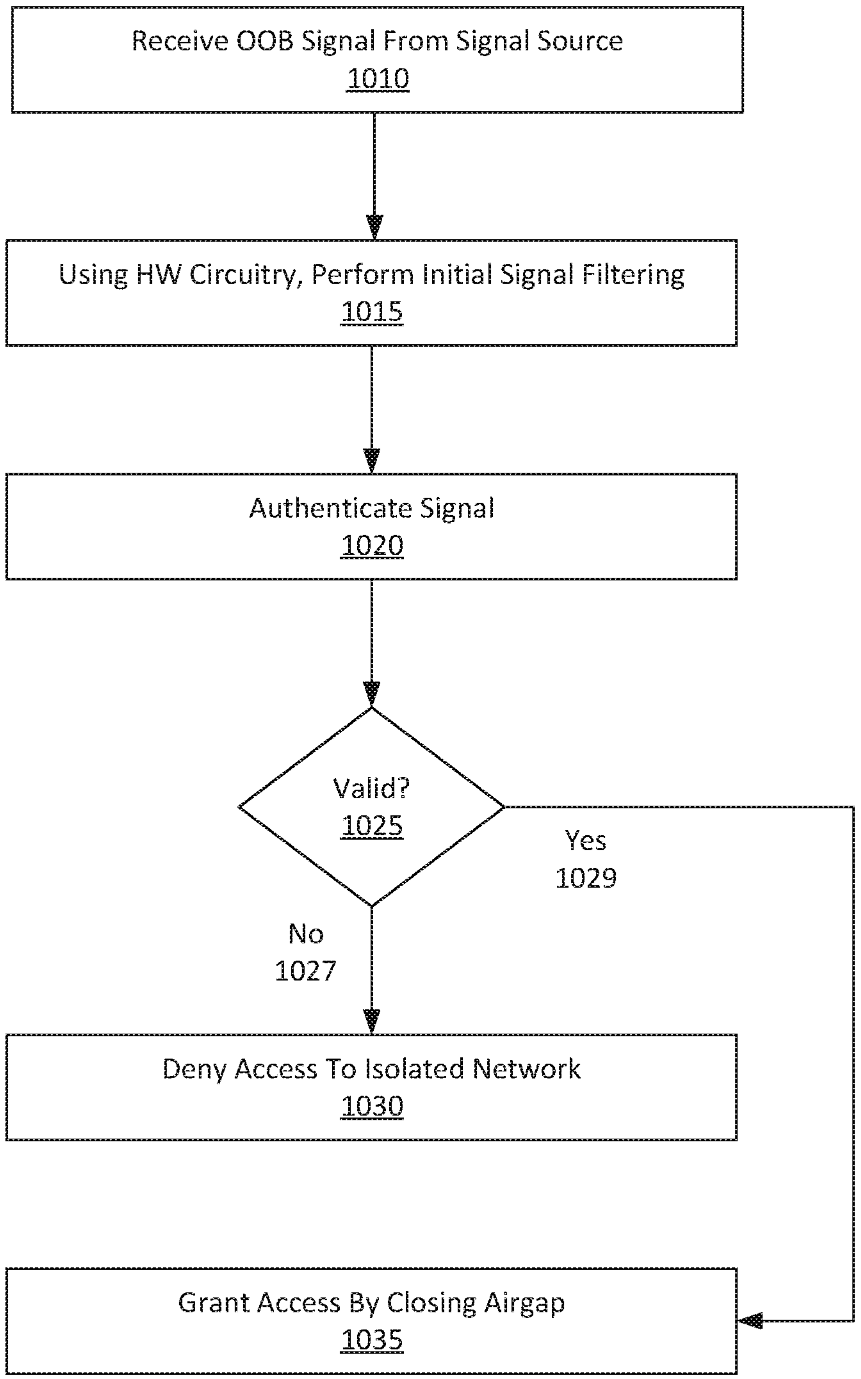
FIG. 10 is a flow chart describing a method of authenticating an out-of-band signal to connect an isolated network to an external network, according to examples described herein.

FIG. 10 is a flow chart describing a method of authenticating an out-of-band signal to connect an isolated network 940 to an external network 950, according to examples described herein. In the below description of FIG. 10, reference may be made to reference characters representing like features as shown and described with respect to FIG. 9. Furthermore, the processes described in connection with FIG. 10 may be performed by an example network isolation device 900 as shown and described with respect to FIG. 9. Still further, any the steps shown in the flow chart of FIG. 10 may be omitted or rearranged to precede or follow any other step.

Referring to FIG. 10, the network isolation device 900 can receive an out-of-band signal (e.g., out-of-band wireless signal 905 or signal received via the out-of-band line 907) from a signal source (1010). As provided herein, the out-of-band signal can comprise any signal that corresponds to the signal receiver 902 of the network isolation device 900, and can utilize a communication protocol that is distinct from the communication protocol(s) utilized by the external network 950. In some examples, the signal receiver 902 can include a hardware signal filter 912 that pre-processes the incoming signal and acts as an initial filter prior to decoding, decrypting, or otherwise verifying the signal or source of the signal (1015). If the signal does not satisfy the hardware filter layer 912 of the signal receiver 902, then the process ends, and no further authentication is performed. However, if the signal does satisfy the hardware filter layer 912, then a signal authenticator 914 of the receiver 902 can further process the signal 905 through decoding, decryption, or other verification techniques described herein (1020).

The signal authenticator 914 may then determine if the signal 905 and/or signal source is valid (1025). If not (1027), the signal receiver 902 denies access to the isolated network 940 by maintaining the air gap 919 in an open state (1030). However, if the signal and/or signal source is valid (1029), then the signal receiver 902 controls the airgap device 916 to close the air gap 919 and connect the isolated network 940 to the external network 950 (1035). To isolate the internal network 940 from the external network 950, the same or a similar authentication process is performed to verify the signal 905 and/or signal source and open the air gap 919 accordingly.

Example Circuit Boards

Figure 11A:
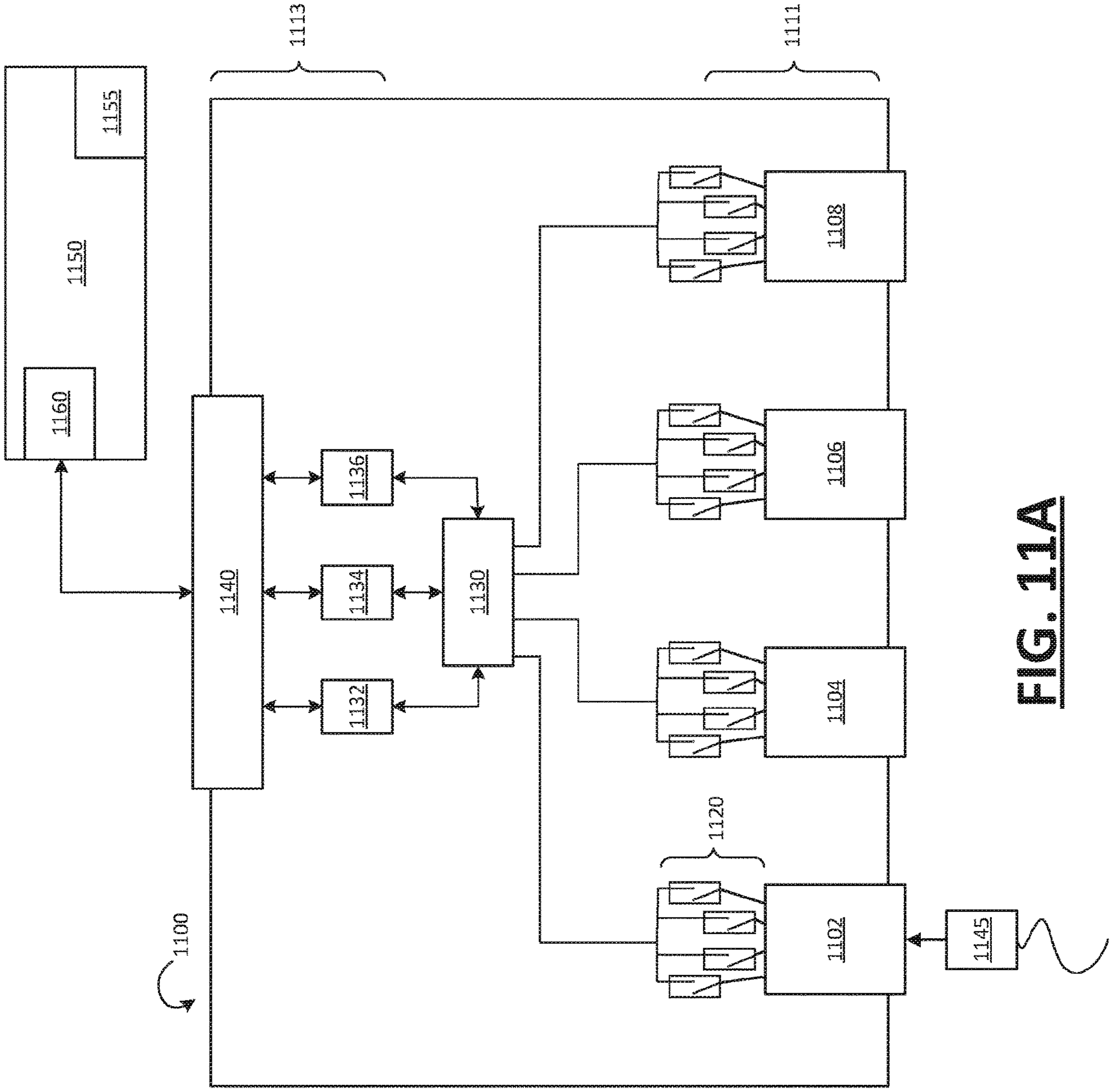
FIGS. 11A and 11B comprise diagrams of example circuit boards that implement the functions of the example air-gap-based network isolation devices described herein.
Figure 11B:
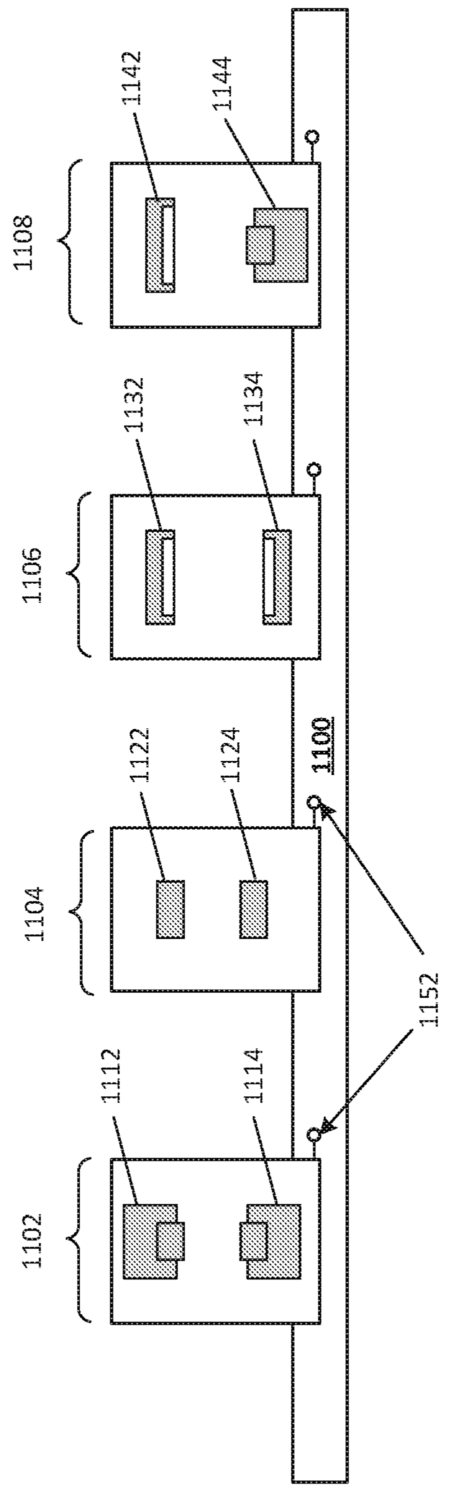

FIGS. 11A and 11B comprise diagrams of an example circuit board 1100 that implements the functions of the example air-gap-based network isolation devices described herein. Referring to FIG. 11A, a circuit board 1100 can include a set of connection port elements 1102, 1104, 1106, 1108 on a proximal end 1111 of the circuit board 1100. Each connection port element 1102 can include one or more connection ports that can each receive a pair of port connectors 1145, such as an RJ45, USB, or fiber optic port connector. The circuit board 1100 can include any number of connection port elements, each comprising a pair of connection ports, as shown in FIG. 11B (ports 1112, 1114, 1122, 1124, 1132, 1134, 1142, 1144). In the examples shown in FIGS. 11A and 11B, the circuit board 1100 includes four connection port elements 1102, 1104, 1106, and 1108, each of which are connected to a set of relays 1120.

Each connection port element 1102, 1104, 1106, 1108 can be isolated from the other connection port elements, with each having a unique whitelist of authorized devices and authentication protocol. For example, the computing and/or memory resources that are connected to connection port element 1102 via port connector 1145 are only accessible over a network link (e.g., the Internet) when the air gaps in the relay array 1120 for connection port element 1102 are closed, which occurs only after a whitelisted device transmits an access request and the authentication sequence for that particular connection port element 1102 is performed. As shown in FIG. 11A, the relay array 1120 includes four discrete relays. However, other arrangements may include more or less relays for a particular connection port element, depending on the implementation. For example, a connection port element comprising USB ports (as shown for connection port element 1106 in FIG. 11B) may include only two relays, whereas a connection port element comprising fiber optic ports (as shown for connection port element 1104 in FIG. 11B) may include one or multiple relays depending on the implementation.

In various implementations, the circuit board 1100 includes a controller 1130 (e.g., a microprocessor) and one or more out-of-band communication receivers included in a communications module 1140 on a distal end 1113 of the circuit board 1100. As provided herein, the out-of-band receivers of the communications module 1140 can operate using communication protocols that are distinct from the network(s) connected to the connection port elements 1102, 1104, 1106, 1108. Specifically, the connection port elements 1102, 1104, 1106, 1108 can be connected to the Internet, whereas the communication receivers of the communications module 1140 can operate using different communication protocols (e.g., SMS, LoRa, I2C, serial comms, etc.).

In various examples, a computer 1150 in communication with the communications module 1140 executes logic to authenticate network access to the computing and/or memory resources connected to any of the port elements 1102, 1104, 1106, 1108 by way of out-of-band communications. For example, a user can configure an access protocol for connection port element 1102 via a user interface that communicates with computer 1150. By interacting with the user interface, the user can provide a whitelist of devices (e.g., phone numbers or other device identifiers) for connection port element 1102 and can further configure a unique authentication protocol for connection port element 1102, such as a text exchange in which a requester is to provide a codeword via text message.

The master computer 1150 can include one or more serial transceivers 1160—such as RS-485, RS-232, or CanBus transceivers—to communicate with one or more corresponding serial receivers housed in the communications module 1140. The computer 1150 can further include one or more out-of-band transceivers 1155—such as an SMS modem or LoRa transceiver—that communicate with a computing device of a user that wishes provide a network link to a computing device, computing system, or memory resource connected to a connection port element 1102, 1104, 1106, 1108. As described herein, the master computer 1150 performs the access authorization and authentication steps for each of the connection port elements 1102, 1104, 1106, 1108.

When the authentication process is performed for, say, connection port element 1102, the computer 1150 transmits a serial command using the serial transceiver 1160 to a corresponding serial receiver or driver of the communications module 1140. As depicted in FIG. 11A, the serial drivers 1132, 1134, 1136 are separate components to the communications module 1140, but arrangements are contemplated in which the serial drivers 1132, 1134, 1136 (e.g., RS-485, RS-232, and/or CanBus drivers) are included as components of the communications module 1140. The one or more serial transceivers 1160 can transmit the commands to open and close the relays 1120 of connection port element 1102 to the communications module 1140, which can pass the commands to the controller 1130. The controller 1130 can then implement the commands as instructed, such as opening and closing the relay array 1120 to disconnect and connect the network link to the computing resources connected to connection port element 1102 respectively.

In a default mode, the relays 1120 can remain open until an authorized device performs the configured authentication process (e.g., a series or text message exchanges) for a particular connection port element 1102, 1104, 1106, 1108, which is authenticated by the master computer 1150. As described, the master computer 1150 then transmits a command (e.g., a serial command, such as RS-485 or RS-232) to the communications module 1140, which can include or otherwise communicate with one or more corresponding serial drivers 1132, 1134, 1136 that forward the command to the controller 1130 to close the set of relays 1120 and enable network access to any devices connected to connection port element 1102 via the port connector 1145. As an alternative, the default configuration can comprise closed relays 1120 that provide network connectivity, where the authentication process is required to open the relays 1120 and provide network connectivity.

Using connection port element 1102 as an example, a user can physically connect a computing device or memory device to connection port element 1102 using port connector 1145, where the relays 1120 are open by default. As described with respect to FIG. 11B below, an additional port connector is connected to a second port of port element 1102 and a network link, such as a Wi-Fi router. Accordingly, when the relays 1120 are open, the user's computing device or memory device is not connected to the network. The user can utilize an out-of-band device, such as a smartphone, to send an out-of-band message (e.g., an SMS message) comprising an access request for connection port element 1102 to the computer 1150, which can include an out-of-band modem 1155 (e.g., an SMS modem) to receive the message. The computer 1150 performs a lookup of the device identifier (e.g., the phone number) of the user's out-of-band device to determine whether the device identifier is in the whitelist of devices for connection port element 1102.

If so, the computer 1150 transmits a message back to the user's device requesting an authentication message or signal for connection port element 1102 (e.g., a codeword). If the authentication message or signal for connection port element 1102 is not received or if the user transmits an incorrect message or signal, the relays 1120 remain open and no network access is granted. However, if the user transmits a response message that includes the codeword or authentication message, the computer 1150 authorizes network access and transmits a serial command using a serial transceiver 1160 to the communications module 1140 of the circuit board 1100. A corresponding driver 1132, 1134, or 1136 passes the serial command to the controller 1130, which transmits a command to close the relays 1120 and enable network access for connection port element 1102.

As provided herein, alternative out-of-band communication protocols may be used to open and close the relays 1120 of any of the connection port elements 1102, 1104, 1106, 1108, such as LoRa, Bluetooth, radio, or Zigbee communications. For such alternative communications, the computer 1150 includes a corresponding out-of-band transceiver or modem 1155 to perform the authentication steps and provide network access to devices connected to the connection port elements 1102, 1104, 1106, 1108 in the manner described herein. The drivers 1132, 1134, 1136 can comprise serial drivers (e.g., RS-232, RS-485, CanBus, etc.) that enable serial commands from the serial transceiver 1160 to be received by the controller 1130, which processes the commands to open and close designated relay arrays 1120 accordingly.

Referring to FIG. 11B, the circuit board 1100 includes multiple configurations of connection port elements 1102, 1104, 1106, and 1108. The connection port elements can comprise RJ-45 ports 1112, 1114, as shown for connection port element 1102, fiber optic ports 1122, 1124, as shown for connection port element 1104, USB ports 1132, 1134, as shown for connection port element 1106, and/or a mixed configuration, such as a combination of USB port 1142 and RJ45 port, as shown for connection port element 1108. Any combination of connection ports may be used for any particular connection port element, and any combination of connection port elements may be used for the overall circuit board 1100. For example, the circuit board 1100 can include connection port elements comprised solely of USB ports, RJ45 ports, fiber optic ports, or any other suitable port-in and port-out connections for connecting to a network link (e.g., the Internet) and computing systems, devices, and/or memory resources. Accordingly, the particular arrangement shown in FIG. 11B is non-limiting, and is intended to illustrate the broad capabilities of the example air-gap-based network isolation devices described throughout the present disclosure.

In various examples, each connection port element 1102, 1104, 1106, 1108 can be associated with a status indicator 1152, which can comprise one or more light elements (e.g., a multi-colored LED). The light element(s) 1152 can indicate the current status of the associated connection port element, such as whether the connect port element is closed, open, connected, disconnected, or whether authentication is in progress for the connection port element. Each status can correspond to a unique color or color combination, such as green for a connected network link, red for a disconnected state, and yellow for an authentication in progress state. Each light element 1152 may be controlled by the controller 1130 of the circuit board 1100 when respective serial messages or commands are received.

In operation, a user can plug a network link (e.g., a Wi-Fi router) to a port-out connection port of a connection port element (e.g., port 1114 of element 1102), and can connect a device requiring network isolation to the port-in connection port of the same connection port element (e.g., port 1112 of element 1102). The user can then utilize a whitelisted out-of-band device (e.g., the user's smartphone) to communicate with the master computer 1150, and perform the authentication process for connection port element 1102 to close the relay array 1120 and provide network access to the previously network-isolated device.

Figure 11C:
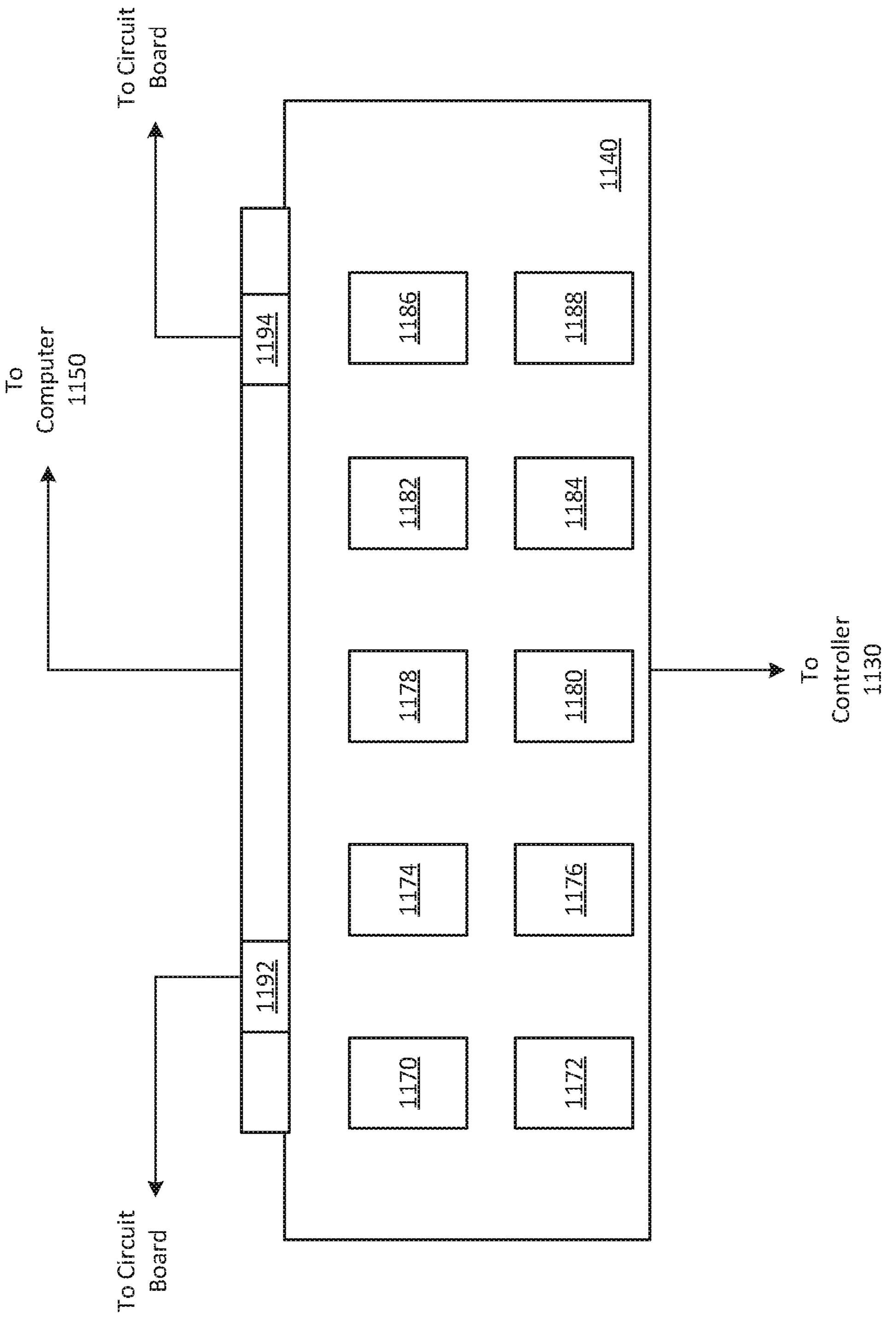
FIG. 11C depicts a diagram of an example communications module of the example circuit board shown in FIGS. 11A and 11B, according to various examples.

FIG. 11C depicts a diagram of an example communications module 1140 of the example circuits board 1100 shown in FIGS. 11A and 11B, according to various examples. As described above, the communications module 1140 can include any number and type of serial and out-of-band transceivers that enable the communications module 1140 to communicate with the master computer 1150, the controller 1130, and other circuit boards that are daisy-chained to circuit board 1100 via wired connection interfaces 1192, and 1194. In the example shown in FIG. 11C, the communications module 1140 includes an RS-232 driver 1170, an RS-485 driver 1174, a CanBus driver 1178, a ModBus driver 1182, a FieldBus driver 1186, an I2C driver 1172, a Zigbee receiver 1176, an LP/WAN receiver 1180, a WirelessHART receiver 1184, and a LoRA receiver 1188, each of which enables the communications module 1140 to communicate with or otherwise pass communications to corresponding transceivers, drivers, and/or receivers of the master computer 1150, controller 1130, and daisy-chained circuit boards respectively.

Any number of circuit boards (each having the same or similar configuration of circuit board 1100) may be daisy-chained to each other and connected either directly to the master computer 1150, or indirectly via one of the circuit boards. The daisy-chained circuit boards and master computer 1150 may be housed in a chassis with corresponding apertures for power, the connection ports of the connection port elements, light elements, and other suitable connections for the master computer 1150. Accordingly, the chassis may be produced as a standalone device that an administrator can operate using a computing device and user interface to provide whitelisted devices for each connection port element, and the unique authentication protocols for each connection port element. The master computer 1150 then stores these access configurations for each connection port element for use in authorizing and authenticating whitelisted devices to provide network access for the sensitive resources connected to the connection port elements.

Methodology

Figure 12:
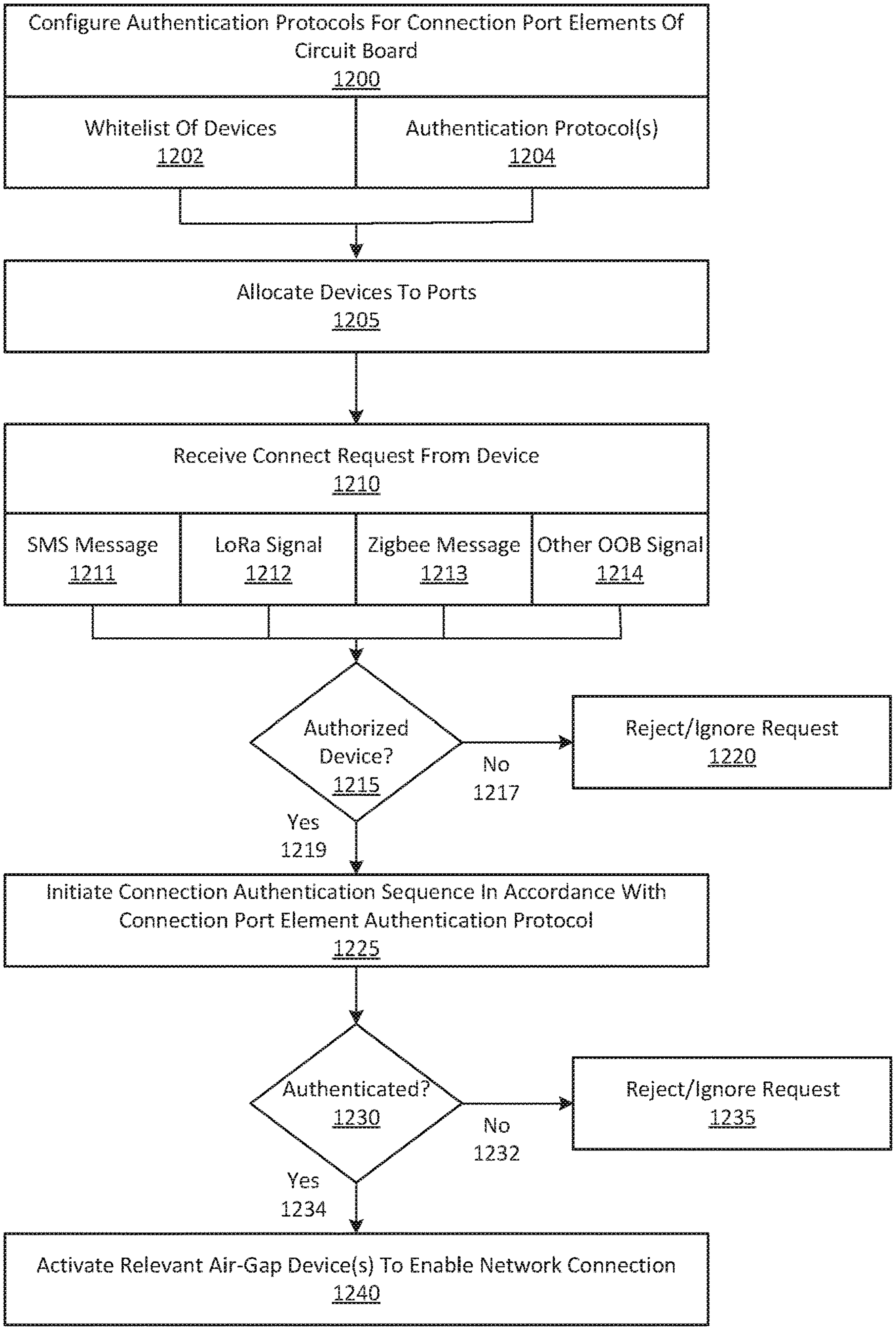
FIG. 12 is a flow chart describing a method of operating an air-gap-based network isolation device, according to examples described herein.

FIG. 12 is a flow chart describing a method of operating an air-gap-based network isolation device, as performed by one or more controllers of the example circuit boards described herein. In the below description of FIG. 12, reference may be made to reference characters representing like features as shown and described with respect to FIGS. 11A, 11B, and 11C. Furthermore, the processes described with respect to FIG. 12 may be performed by the master computer 1150, controller 1130, or a combination of the master computer 1150 and the controller 1130 depicted in FIGS. 11A and 11B (hereinafter referred to the "system"). Referring to FIG. 12, the system can configure authentication protocols for the connection port elements 1102, 1104, 1106, 1108 of a circuit board 1100 (1200). As described herein, a user or administrator can connect with the master computer 1150 to provide a whitelist of out-of-band devices (1202) and an authentication protocol for each of the connection port elements 1102, 1104, 1106, 1108 of the circuit board 1100 (1204).

As an addition or alternative, based on the administrator's or user's inputs via the user interface, the system can allocate which out-of-band devices (e.g., by device identifier, such as phone numbers) are to be whitelisted for each particular connection port element 1102, 1104, 1106, 1108 (1205). The system may then store the authentication protocols and whitelists for each connection port element. Thereafter, the system may receive a connection request from an out-of-band device (1210). In certain examples, the connection request can indicate which connection port element the user wishes to connect. The message can comprise any out-of-band communication, such as an SMS message (1211), a LoRa signal (1212, a Zigbee message (1213), or other out-of-band message or signal that utilizes a communication protocol that is distinct from the communication protocol of the network link (e.g., Internet communication protocol) (1214).

The system can perform a whitelist lookup for the specified connection port element to determine whether the out-of-band device is an authorized device (1215). If not (1217), the system ignores or otherwise rejects the connection request (1220). However, if so (1219), the system initiates the connection authentication sequence in accordance with the authentication protocol of the specified connection port element (1225). As provided herein, the authentication sequence can comprise a particular message exchange sequence in which the user provides an out-of-band message comprising an access message or codeword specified for the connection port element.

The system then determines whether the exchange with the out-of-band device matches the authentication protocol for the connection port element (e.g., whether a correct codeword has been received) (1230). If not (1232), then the system ignores or otherwise rejects the connection request (1235). However, if so (1234), the system grants connectivity and activates the relevant air-gap device(s) (or relay array 1120) of the specified connection port element to enable the network connection (1240). As described above, the master computer 1150 can perform the authentication process and transmit a serial command to the controller 1130 to close the relays 1120 upon authenticating the out-of-band device. In various examples, the user can perform the same or similar authentication process to reopen the relays 1120. Additionally or alternatively, the connected status can time out after a predetermined period of time, and/or the user may provide a simple input either on the connected device or the out-of-band device to reopen the relays 1120 can disconnect the device from the network.

Figure 13:
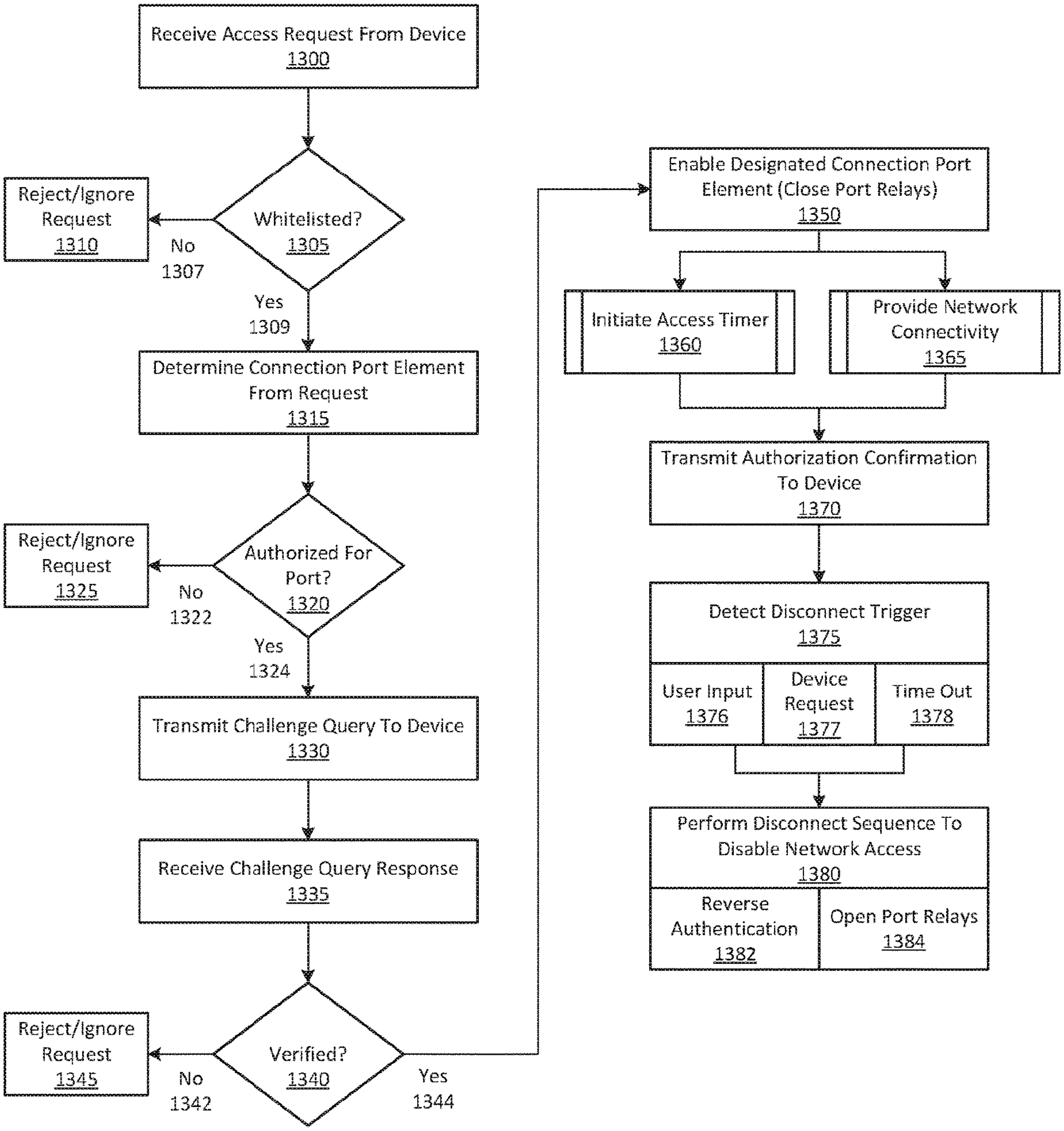
FIG. 13 is another flow chart describing an authentication method of operating an air-gap-based network isolation device, according to examples described herein.

FIG. 13 is another flow chart describing an authentication method of operating an air-gap-based network isolation device, according to examples described herein. In the below description of FIG. 13, reference may be made to reference characters representing like features as shown and described with respect to FIGS. 11A, 11B, and 11C. Furthermore, the processes described with respect to FIG. 13 may be performed by the master computer 1150, controller 1130, or a combination of the master computer 1150 and the controller 1130 depicted in FIGS. 11A and 11B (hereinafter also referred to the "system"). Referring to FIG. 13, the system can receive an access request from an out-of-band device, such as a user's mobile computing device (1300). Data included with the request (e.g., metadata) can indicate a device identifier (e.g., a phone number) of the out-of-band device.

The system can initially determine whether the device is whitelisted for any of the connection port elements (1305). If not (1307), the request is ignored or otherwise rejected (1310). However, if the device is whitelisted (1309), the system determines a connection port element from the request (1315). For example, the request can comprise a message stating "open port one," which can correspond to a specific connection port element of the circuit board 1100. The system may then determine whether the out-of-band device is authorized for the connection port element specified in the request (1320). If not (1322), the system ignores or otherwise rejects the request (1325). However, if the device is authorized (1324), the system can transmit a challenge query to the device (1330). The challenge query can be configured specifically for the requested connection port element, and can comprise a request for a codeword, password, specific input or signal, or other sequence of characters required for controlling the connection port element, as determined from the authentication protocol for the connection port element.

The system may then receive a challenge query response from the out-of-band device (1335). The system then determines whether the challenge query response is verified or if the response matches the response required in the authentication protocol (1340). In not (1342), again, the system rejects or otherwise ignores the request (1345). However, if the response is correct and verified (1344), the system enables the designated connection port element by, for example, closing the relays 1120 for the connection port element (1350). In certain examples, the system can also initiate a timer (e.g., if the authentication protocol so mandates) that enables access for only a predetermined period of time before the relays 1120 automatically reopen and disables network access (1360). Furthermore, as described herein, the connection port element may be connected to a network link, such as a Wi-Fi router, which can provide network connectivity for the device connected to the connection port element (1365).

In certain examples, the system can transmit an authorization and/or connection confirmation to the out-of-band device indicating that the connection port element has been activated (1370). During this period, the user can access or otherwise utilize the device (e.g., via a wireless Internet connection) connected to the connection port element over the network link. At any given time, the system can detect a disconnect trigger (1375), which can comprise a user input on the connected device (1376), a device request from the out-of-band device (1377), or a session time out from the timer (1378). In response, the system can perform a disconnect sequence to disable network access for the connection port element (1380). In some aspects, the disconnect sequence can simply comprise opening the port relays to disable the connection port element (1384). In variations, the disconnect sequence can comprise a reverse authentication process in which the system determines whether the out-of-band device requesting the disconnect is whitelisted for the connection port element, transmits a challenge query, and receives the verified response to open the relays 1120 (1382).

It is contemplated that the system can perform multiple authentication processes for multiple connection port elements simultaneously, and any number of computing devices, memory resources, or computing systems may be connected to the circuit board 1100, or a daisy-chained set of circuit boards at the same time.

Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A circuit board device comprising:

an airgap device operable to switch between a disconnected state in which a physical airgap is formed by the airgap device, and a connected state in which the physical airgap is closed;

a memory resource storing configuration data for configuring an authentication process, the configuration data including a whitelist of authorized devices or users for an internal network or resource;

a set of connection port elements, each connection port element in the set of connection port elements being interconnected to the airgap device and including a plurality of connection ports, including a first connection port for connecting to the internal network or resource, and a second connection port for connecting to a data network;

wherein for at least a first connection port element of the set, the respective first connection port and the second connection port are interconnected to one another by the airgap device;

a controller connected to the airgap device; and a communications module comprising a set of communication receivers connected to the controller;

wherein the communications module is configured to (i) receive, via a communication receiver of the set, a connection request from an external computing device, the connection request specifying the first connection port element of the set, (ii) in response to receiving the connection request, implement the configured authentication process to determine whether the external computing device is authorized to enable the first connection port element; (iii) based on an outcome of the configured authentication process, cause the controller to trigger the airgap device into switching between the disconnected state and the connected state, wherein when the airgap device is in the connected state, the first connection port element is enabled and connects the internal network or resource to the data network; and wherein when the airgap device is in the disconnected state, the first connection port element is configured to physically airgap the internal network or resource from the data network.

2. The circuit board device of claim 1, wherein the first connection port element is operable to implement an authentication protocol that is specific to the first connection port element, separate from the second connection port of the first connection port element, and wherein the authentication protocol is configured in accordance with the stored configurations.

3. The circuit board device of claim 1, further comprising:

a plurality of status indicators, each status indicator being associated with a corresponding connection port element of the set of connection port elements;

wherein a first status indicator of the plurality of status indicator is configured to indicate whether the first connection port element is enabled.

4. The circuit board device of claim 3, wherein the first status indicator comprises a multi-colored light element.

5. The circuit board device of claim 1, wherein the data network includes the Internet, and wherein each communication receiver of the set is operable to receive an out-of-band communication, transmitted using a communication protocol that is distinct from a communication protocol of the data network.

6. The circuit board device of claim 5, wherein the out-of-band communication is transmitted as a short message service (SMS) from a computing device of a user.

7. The circuit board device of claim 6, wherein the communications module implements the authentication process by authenticating at least one of a message transmitted from the external computing device or a source of the message.

8. The circuit board device of claim 7, wherein upon completing the authentication process, the airgap device is switched to the connected state for a predetermined duration or until a second out-of-band communication is communicated from the external computing device.

9. A system comprising:

a computer system and a circuit board device, the computer system comprising a communication transceiver to communicate with a computing device of a user and a serial transceiver, the circuit board device comprising:

an airgap device operable to switch between a disconnected state in which a physical airgap is formed by the airgap device, and a connected state in which the physical airgap is closed;

a memory resource storing configuration data for configuring an authentication process, the configuration data including a whitelist of authorized devices or users for an internal network or resource;

a set of connection port elements, each connection port element in the set of connection port elements being interconnected to the airgap device and including a plurality of connection ports, including a first connection port for connecting to the internal network or resource, and a second connection port for connecting to a data network;

wherein for at least a first connection port element of the set, the respective first connection port and the second connection port are interconnected to one another by the airgap device;

a controller connected to the airgap device; and a communications module comprising a set of communication receivers connected to the controller;

wherein the communications module is configured to (i) receive, via a communication receiver of the set, a connection request from an external computing device, the connection request specifying the first connection port element of the set, (ii) in response to receiving the connection request, implement the configured authentication process to determine whether the external computing device is authorized to enable the first connection port element; (iii) based on an outcome of the configured authentication process, cause the controller to trigger the airgap device into switching between the disconnected state and the connected state;

wherein when the airgap device is in the connected state, the first connection port element is enabled and connects the internal network or resource to the data network; and wherein when the airgap device is in the disconnected state, the first connection port element is configured to physically airgap the internal network or resource from the data network.

10. The system of claim 9, wherein each connection port element of the set includes a distinct authentication process that is configured in accordance with a corresponding set of configuration data, and wherein each connection port element of the set enables a corresponding internal network or resource to be connected to the data network using the airgap device, or a second airgap device.

11. The system of claim 10, wherein the communication transceiver of the computer system includes an SMS modem to communicate with an authorized mobile computing device, using SMS messages, and wherein upon the computer system completing the authentication process, the computer system transmits a command to the controller to close the airgap device and enable one of the connection port elements of the set, as specified by a user in an SMS communication.

12. A computer-implemented method of authenticating network access for an air-gap-based, network isolation device, the method comprising:

storing a set of configuration data for implementing an authentication process, the configuration data including a whitelist of authorized devices or users for the air-gap-based, network isolation device;

receiving, over a first network type, a connection request from a computing device of a user, the connection request specifying a connection port element of the air-gap-based, network isolation device;

determining, using the configured authentication process, whether the computing device of the user is authorized to enable the connection port element;

in response to determining that the computing device of the user is authorized to enable the connection port element, initiating an authentication sequence of the authentication process with the computing device of the user; and in response to the user performing the authentication sequence, activating a set of relays for the connection port element.

13. The method of claim 12, wherein the connection port element comprises a network connection port connected to an Internet router, and a second connection port connected to a network-isolated device.

14. The method of claim 13, wherein upon activating the set of relays for the connection port element, the network-isolated device is provided with Internet connectivity.

15. The method of claim 12, wherein the air-gap-based, network isolation device comprises a plurality of connection port elements, each of the plurality of connection port elements having a corresponding whitelist.

* * * * *